United States Patent
Usuba

(10) Patent No.: US 7,420,930 B2
(45) Date of Patent: Sep. 2, 2008

(54) COMMUNICATION APPARATUS, COMMUNICATION METHOD, COMMUNICATION PROGRAM AND INFORMATION RECORDING MEDIUM HAVING THE PROGRAM RECORDED THEREON

(75) Inventor: Hidemi Usuba, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 825 days.

(21) Appl. No.: 10/845,527

(22) Filed: May 14, 2004

(65) Prior Publication Data

US 2005/0025107 A1    Feb. 3, 2005

(30) Foreign Application Priority Data

May 16, 2003    (JP)    ............... P2003-138915

(51) Int. Cl.
*H04J 1/16*    (2006.01)
*H04L 12/56*    (2006.01)

(52) U.S. Cl. .................. 370/252; 370/282; 370/389; 713/155

(58) Field of Classification Search .............. 370/428, 370/429, 419, 421, 423, 230, 235, 248, 252, 370/282, 389; 703/28; 710/110, 305, 8; 713/155; 707/200
See application file for complete search history.

(56) References Cited

U.S. PATENT DOCUMENTS

| 5,737,600 | A | * | 4/1998 | Geiner et al. ............... 707/200 |
| 6,169,725 | B1 | | 1/2001 | Gibbs et al. |
| 2002/0007264 | A1 | * | 1/2002 | Swoboda ...................... 703/28 |
| 2002/0171624 | A1 | | 11/2002 | Stecyk et al. |
| 2004/0236874 | A1 | * | 11/2004 | Largman et al. ............... 710/8 |

FOREIGN PATENT DOCUMENTS

| EP | 1014364 A1 | 6/2000 |
| EP | 1 071 255 A1 | 1/2001 |
| EP | 1073236 A2 | 1/2001 |
| EP | 1 113 625 A2 | 7/2001 |
| EP | 1 182 827 A2 | 2/2002 |
| JP | 2002-217907 A | 8/2002 |

OTHER PUBLICATIONS

European Office Action dated Aug. 10, 2006.

* cited by examiner

*Primary Examiner*—John Pezzlo
(74) *Attorney, Agent, or Firm*—Sughrue Mion, PLLC

(57) ABSTRACT

A communication apparatus is to be connected to a network to establish, one or more connection with one or more processing apparatus connected to the network, to perform at least one of transmission and reception of data. The communication apparatus includes a reception device, a judgment device and a protection device. The reception device receives a disconnection request for disconnection of the connection, from the processing apparatus. The judgment device judges whether the disconnection request as received is legal or not. The protection device causes, only when there was made a judgment that the disconnection request as received is not legal, disablement of execution of a disconnection processing in response to the disconnection request to protect the connection.

11 Claims, 15 Drawing Sheets

COMMUNICATION APPARATUS, COMMUNICATION METHOD, COMMUNICATION PROGRAM AND INFORMATION RECORDING MEDIUM HAVING THE PROGRAM RECORDED THEREON

BACKGROUND OF THE INVENTION

1. Field of the Invention

The present invention relates generally to the field of a communication apparatus, a communication method, a communication program and an information recording medium having the communication program recorded thereon, and more particularly to the communication apparatus and method for performing at least one of transmission and reception of data relative to the other processing apparatus connected to a network, the communication program for executing such communication and the information recording medium on which the communication program has been recorded.

2. Related Art

Recently, a so-called "IEEE1394 Standard" (officially known as "IEEEStd. 1394-1995 IEEE Standard for a High Performance Serial Bus" and "IEEEStd. 1394a-2000 IEEE Standard for a High Performance Serial Bus-Amendment 1") has been widely utilized as a standard such as a serial on the basis of which a real-time transmission of information can be made through a network between processing apparatuses (e.g. a personal computer and a digital video camera). Many products such as personal computers and digital video cameras provided with a serial port based on the above-mentioned standard have become commercially practical.

The IEEE1394 standard enables data to be transmitted at a high transmission speed, with the result that a high degree of freedom in formation of topology can be ensured, and the standard is suitable for transmission of real-time data through an isochronous data transmission, thus providing advantages effects, as well as high usability in comparison with the conventional interface standards. Data transmission based on the IEEE1394 requires a physical establishment of connection for data transmission between respective information processing apparatuses (hereinafter referred merely to as the "apparatus").

In some of the apparatuses, which are interconnected through the serial interface based on the above-mentioned IEEE1304 standard, the interconnection between the apparatuses is managed based on a standard called "IEC-61883 Part 1 standard", in addition to the above-mentioned IEEE1394 standard.

According to the IEC-61883 Part 1 standard, when a certain apparatus based on this standard is connected to the other apparatus to carry out data transmission, logic plugs (i.e., terminals) for transmission of the data are defined on the respective apparatus, and further, information indicative of the connection state of the respective plugs (more specifically, a register memory that stores in real time establishment of connection of apparatuses, which are connected through the above-mentioned plugs (hereinafter referred as the "plug register")) is defined for each of the plugs, and a control is made to update the stored contents in the plug register in accordance with variation of connection state through the plugs, to manage the respective connection states, as described in Japanese Laid-Open Patent Application No. 2002-217907, pages 3 and 4.

The IEEE1394 standard is established for a wider range of apparatus in comparison with the IEC-61883 Part 1 standard. Accordingly, there is a possibility that there exists an apparatus, which is not based on the IEC-61883 Part 1 standard, but is based on the IEEE1394 standard. There is also a possibility that there exists an apparatus, which is not based per se on the IEC-61883 Part 1 standard, but enables transmission and reception of data based on the IEEE1394 standard through the above-mentioned serial bus.

The establishment of connection for isochronous data transmission between the respective apparatuses based on the IEC-61883 Part 1 standard, and release thereof are controlled through the updated contents stored n the above-mentioned plug resister in this manner.

The update of the stored contents is carried out at the timing of a lock-transaction defined in the above-mentioned IEC-61883 Part 1 standard. When the update of the stored contents provides a state in which the connection is established, the isochronous data are transmitted through the serial bus, and disconnection of the connection causes the transmission of the isochronous data to be halted.

The connections based on the IEC-61883 Part 1 standard include two kinds of connection, i.e., a so-called "Broadcast connection" and a so-called "Point-to point connection" (hereinafter referred to as the "p2p connection").

Of these connections, the Broadcast connection is composed of two kinds of connection, i.e., Broadcast-out connection in which a single plug (i.e., an output plug) provided in a transmitting apparatus is connected to only an isochronous channel on the serious bus, irrespective of the plug of the receiving apparatus, and Broadcast-in connection in which a single plug (i.e., an input plug) provided in a receiving apparatus is connected to only a single isochronous channel on the serious bus, irrespective of the plug of the transmitting apparatus.

On the other hand, the p2p connection is connection in which a plug provided in a single apparatus (i.e., the plug having a function of input or output in the single apparatus) is connected to a plug provided in the other apparatus, in which connection with the above-mentioned single apparatus is established (i.e., the plug having a function of input or output in the other apparatus) through a single isochronous channel on the serious bus, and has a function of protecting the connection established once, in the above-mentioned Broadcast connection. Accordingly, the p2p connection is used in case where it is necessary to protect a one-to-one connection between apparatuses for dubbing of music information.

In the above-mentioned Broadcast connection, the transmitting apparatus and the receiving apparatus are subjected independently to a setting operation, without any mutual independence in operation between these apparatuses. In addition, the other apparatus than the apparatus, which has the connection established, or is provided with a control program, which has currently been executed to control the data transmission is permitted to rewrite the plug register of the apparatus, which has the connection established or make a control of the data transmission.

As a result, in the Broadcast connection, it is possible not only to disconnect the connection established between a certain apparatus and the other apparatus, through any other irrelevant apparatus than these apparatuses, but also to compel the isochronous channel for broadcasting, which is utilized in the apparatus connected through the Broadcast connection, to carry out the data transmission, to be switched to the isochronous channel utilized in the above-mentioned other irrelevant apparatus.

On the contrary, with respect to the p2p connection, there exists a convention that only the apparatus, which established the connection or is provided with the above-mentioned control program, can update the plug register corresponding to the plug currently connected to change the connection state (hereinafter referred to as the "operation rule"), in order to achieve the above-mentioned protection of the connection. Such an operation rule is based on the above-mentioned IEC-61883 Part 1 standard.

The protection of the connection for the p2p connection is guaranteed only in the range of the above-mentioned operation rule. On the other hand, there is a possibility that the data transmission is carried out based on the IEEE1394 standard, even between the apparatuses, which are not based on the IEC-61883 Part 1 standard, as mentioned above. Accordingly, it is technically possible for the apparatus, which is not based on the above-mentioned operation rule, but is based on the IEEE 1394 standard, to compel the plug register through which the data transmission is carried out based on the above-mentioned operation rule, to be updated.

As a result, there exists a problem that, in case where the p2p connection is established through the above-mentioned serial bus, the apparatus, which is not based on the IEC-61883 Part 1 standard and is out of the p2p connection standard, may update the plug register of the currently connected plug of the other apparatus, which is connected through the p2p connection, resulting in an unintentional halt of the isochronous transmission in the p2p connection to be prevented.

In addition, even in the apparatus in which the p2p connection is established based on the IEC-61883 Part 1 standard, there is also conceivable a case in which any transmission error occurs for some reasons in the connection. In such a case, the plug register of the apparatus erroneously connected may be updated, thus causing another problem.

SUMMARY OF THE INVENTION

An object of the present invention, which was made in view of the above-mentioned problems, is therefore to provide communication apparatus and method, which permit protection of connection currently established between apparatuses, even when there is an invalid request for disconnection of the connection, which is out of the standard, a communication program for executing the communication and an information recording medium on which such a communication program has been recorded.

In order to attain the aforementioned object, a communication apparatus according to one of the aspects of the present invention, which is to be connected to a network to establish, one or more connection with one or more processing apparatus connected to the network, to perform at least one of transmission and reception of data, said communication apparatus comprises: a reception device for receiving a disconnection request for disconnection of said connection, from said processing apparatus; a judgment device for judging whether the disconnection request as received is legal or not; and a protection device for causing, only when there was made a judgment that the disconnection request as received is not legal, disablement of execution of a disconnection processing in response to said disconnection request to protect said connection.

The communication apparatus according to the other aspect of the present invention may further comprises: a storage device for storing the number of established connection for each connected processing apparatus, which is indicative of the number of connection established with the processing apparatus, for each processing apparatus; and the number of established connection for each connected processing apparatus calculating device for, when said connection with the processing apparatus is to be disconnected, subtracting the number of connection to be disconnected from said number of established connection for each connected processing apparatus corresponding to the connection prior to disconnection, and wherein: said judgment device judges, when the disconnection request is received from the processing apparatus in which the number of established connection for each connected processing apparatus has already become null, that the disconnection request is not legal.

The communication apparatus according to the other aspect of the present invention may further comprises: a storage device for storing (i) the number of self-established connection, which is indicative of the number of connection established due to a request for establishment, which is made to the processing apparatus by said communication apparatus, and (ii) a total number of connections, is established between the communication apparatus and the processing apparatus; and the number of self-established connection calculating device not only for adding, when the request for establishment of the connection is made to said one of the processing apparatus by said communication apparatus to establish the connection, the number of connection to be established to said the number of self-established connection, but also for subtracting, when any one of connections currently established with said communication apparatus is to be disconnected by said communication apparatus, the number of the connection to be disconnected from said number of self-established connection, and wherein: said judgment device judges, when total number of connections, which are made, in consequence of execution of said disconnection processing, to the processing apparatus by said communication apparatus becomes smaller than said number of self-established connection, that the disconnection request corresponding to said disconnection processing is not legal.

The communication apparatus according to the other aspect of the present invention may further comprises: a storage device for storing the number of externally established connection, which is indicative of the number of connection established due to a request for establishment, which is made to said communication apparatus by said processing apparatus; and the number of externally established connection calculating device not only for adding, when the request for establishment of the connection is made to said communication apparatus by said processing apparatus to establish the connection, the number of connection to be established to said number of externally established connection, but also for subtracting, when any one of connections currently established with said communication apparatus is to be disconnected by said processing apparatus, the number of the connection to be disconnected from said number of externally established connection, and wherein:

said judgment device judges, when said number of externally established connection stored in said storage device in consequence of execution of said disconnection processing becomes negative, that the disconnection request corresponding to subtraction is not legal.

According to the other aspect of the present invention, said communication apparatus may be based on a predetermined standard in correspondence with the network; and said judgment device may judge, when the request as received is based on said predetermined standard, said disconnection request is legal, and when the request as received is not based on said predetermined standard, said disconnection request is not legal.

According to the other aspect of the present invention, said predetermined standard may be an IEEE (Institute of Electrical and Electronic Engineers) standard 1394; and said protection device may cause said disablement of the execution of the disconnection processing, and generate a bus reset according to the IEEE standard 1394, to protect said connection.

According to the other aspect of the present invention, said protection device may cause said disablement of the execution of the disconnection processing, and send a response that the disconnection processing in response to said disconnection request has not been executed, to the processing apparatus from which said disconnection request was sent.

According to the other aspect of the present invention, said protection device may cause said disablement of the execution of the disconnection processing, and said communication apparatus may further comprise a disablement device for disabling a response to said disconnection request from being sent to said processing apparatus from which said disconnection request was sent.

According to the other aspect of the present invention, said protection device may cause said disablement of the execution of the disconnection processing, and send a response that the disconnection processing in response to said disconnection request has been executed, to the processing apparatus from which said disconnection request was sent.

According to the other aspect of the present invention, said connection maybe a p2p (Point-to Point) connection based on an IEEE (Institute of Electrical and Electronic Engineers) standard 1394 and said communication apparatus is based on both of said IEEE standard 1394 and an IEC (International Electrotechnical Commision)-61883, Part 1 standard.

In order to attain the aforementioned object, a communication method according to the other aspect of the present invention, which is to be carried out by a communication apparatus connected to a network to establish, one or more connection with one or more processing apparatus connected to the network, to perform at least one of transmission and reception of data, said communication method comprises:

a reception step for receiving a disconnection request for disconnection of said connection, from said processing apparatus;

a judgment step for judging whether the disconnection request as received is legal or not; and a protection step for causing, only when there was made a judgment that the disconnection request as received is not legal, disablement of execution of a disconnection processing in response to said disconnection request to protect said connection.

In order to attain the aforementioned object, a communication program according to the other aspect of the present invention, is to be executed by a computer that is included in a communication apparatus connected to a network to establish, one or more connection with one or more processing apparatus connected to the network, to perform at least one of transmission and reception of data, to cause the computer to function as:

a reception device for receiving a disconnection request for disconnection of said connection, from said processing apparatus;

a judgment device for judging whether the disconnection request as received is based on said standard or not; and a protection device for causing, only when there was made a judgment that the disconnection request as received is not legal, disablement of execution of a disconnection processing in response to said disconnection request to protect said connection.

In order to attain the aforementioned object, an information recording medium according to the other aspect of the present invention has the above-mentioned communication program recorded thereon so as to be readable by the computer.

DESCRIPTION OF THE PREFERRED EMBODIMENTS

Now, preferred embodiments of the present invention will be described in detail below with reference to the accompanying drawings. In the embodiments of the present invention described below, the present invention is applied to a transmission control processing that is executed in a transmitting apparatus, which transmits required data based on IEEE 1394 standard, to the other apparatus.

I Outline of p2p Connection Based on IEEE 1394 Standard

Now, an outline of the p2p connection based on IEEE 1394 standard will be described with reference to FIGS. 1 to 5, prior to concrete description of the embodiments of the present invention.

Figure 1:
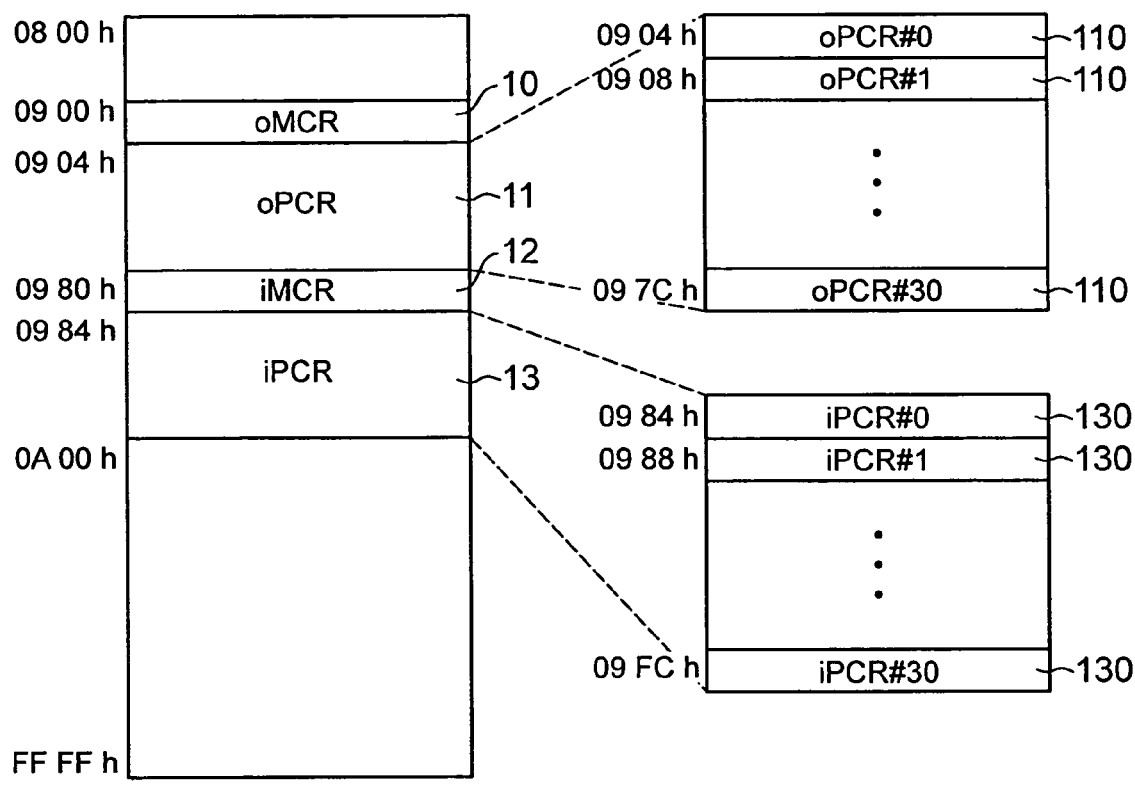
FIG. 1 is a conceptual diagram of a register space.
Figure 2:
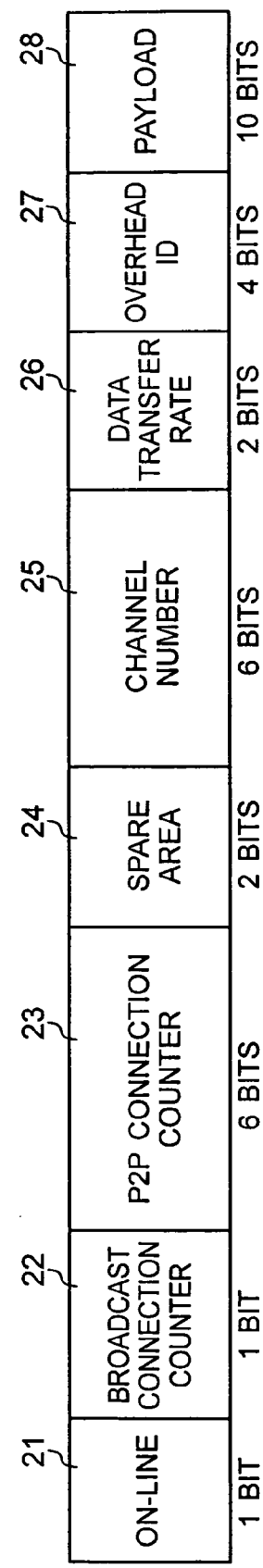
FIG. 2 is a view illustrating a data format of "oPCR"
Figure 3:
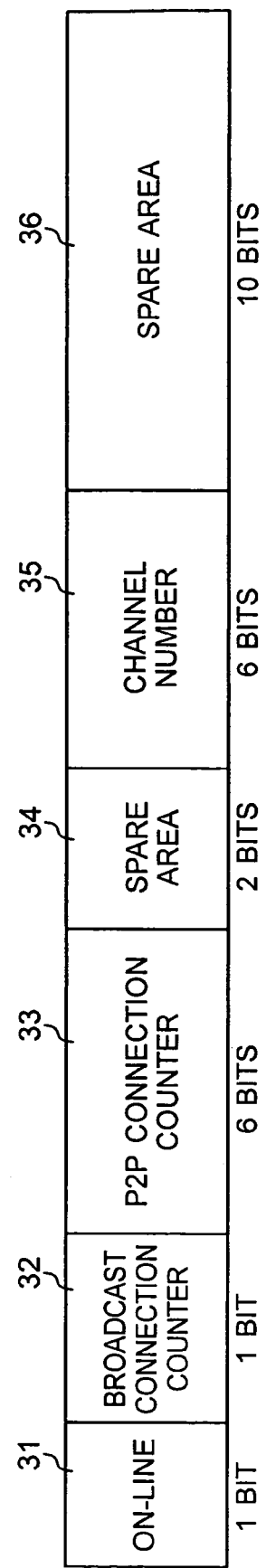
FIG. 3 is a view illustrating a data format of "iPCR"
Figure 4:
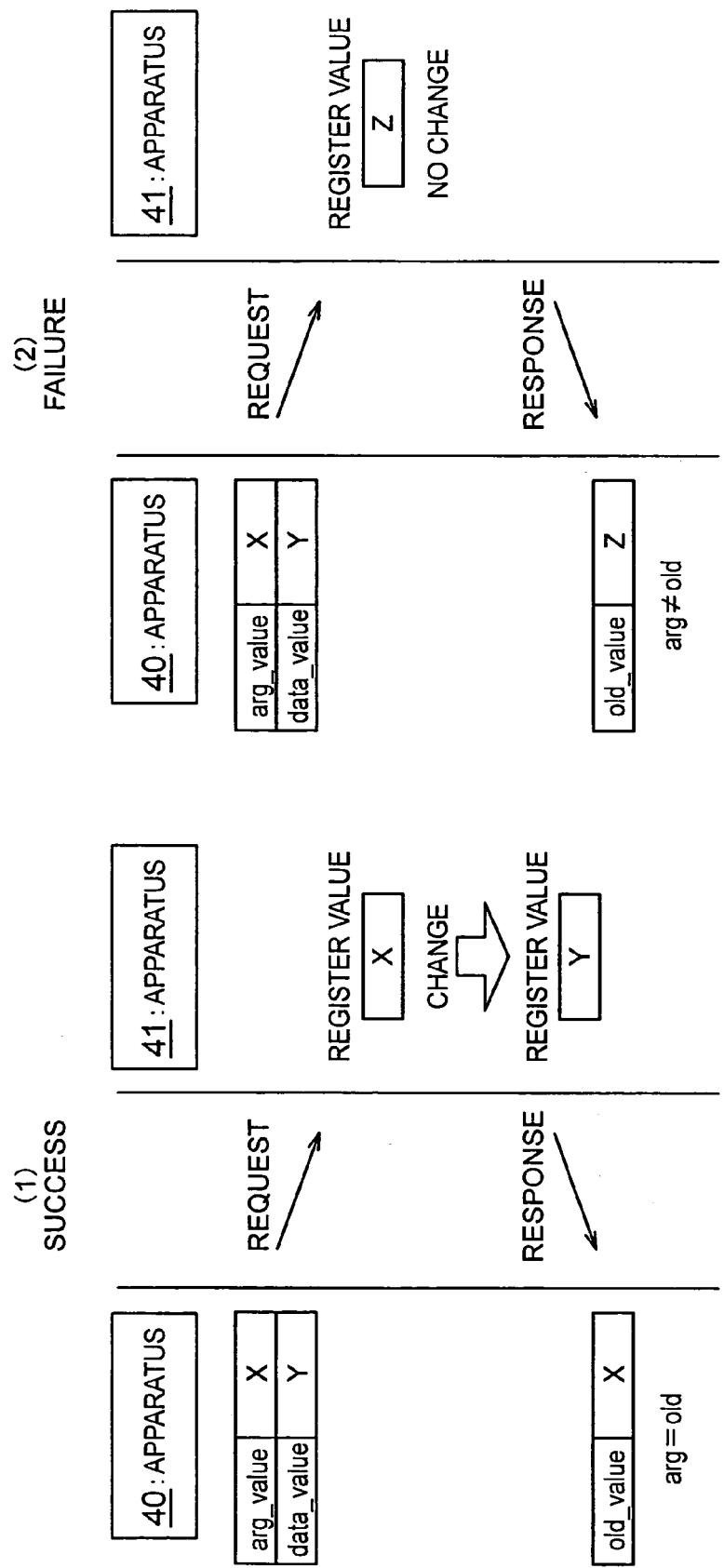
FIG. 4 is a view illustrating response procedures to a request for update of the register.
Figure 5:
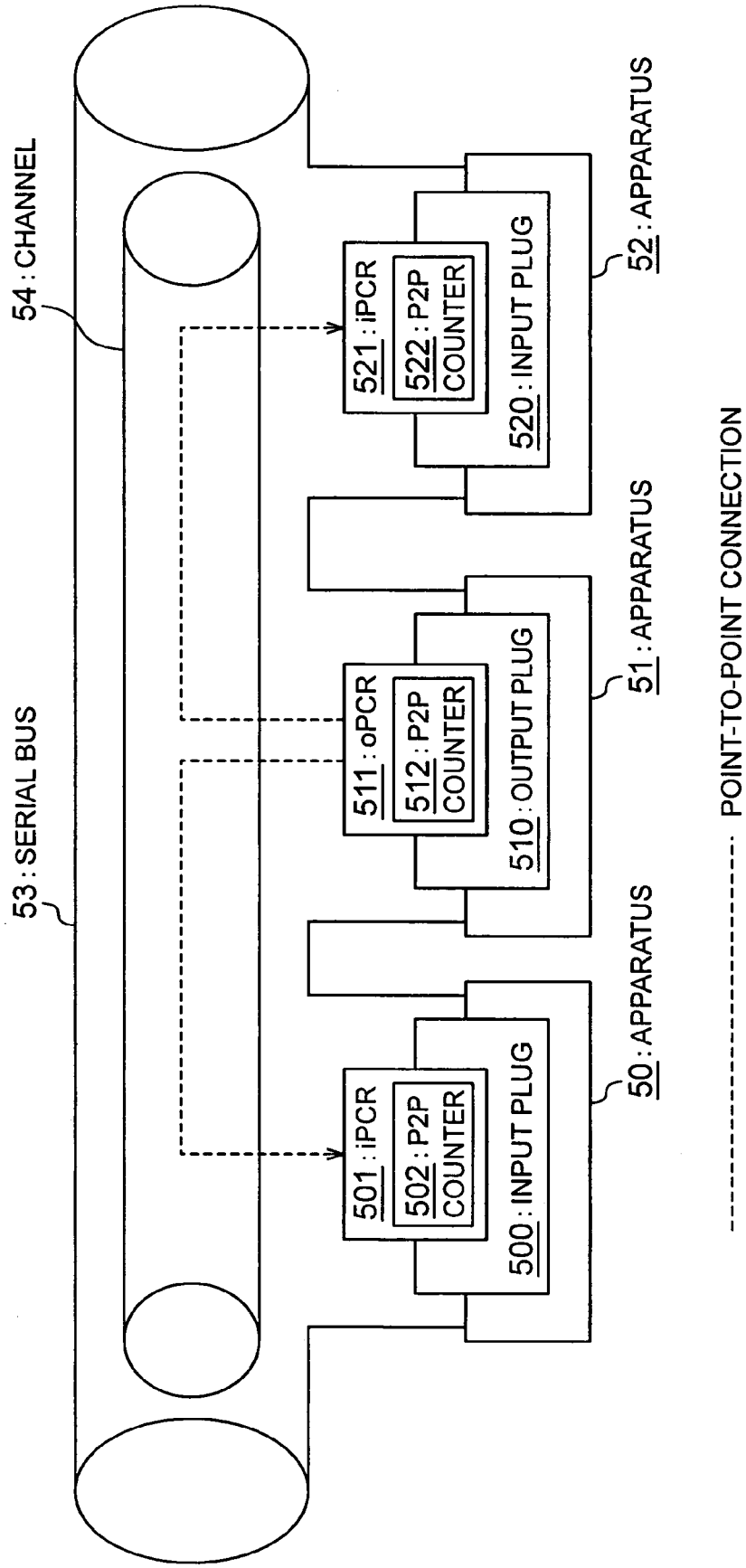
FIG. 5 is a view illustrating an example of establishment of a p2p connection.

FIG. 1 shows a conceptual structure of a plug register, FIG. 2 shows a data format of an output plug control register (hereinafter referred to as "oPCR"), which serves as a plug register on an output side in the p2p connection, FIG. 3 shows a data format of an input plug control register (hereinafter referred to as "iPCR"), which serves as a plug register on an input side in the above-mentioned p2p connection, FIG. 4 shows procedures of a request for update of the respective plug register based on the IEEE 1394 standard and a response to the request, and FIG. 5 shows an example of establishment of the p2p connection.

The IEEE 1394 standard stipulates that, when a packet communication of required data is carried out among a plurality of apparatuses in accordance with the standard, an address, which is indicative of a place in which the data are to be written in the data receiving apparatus connected to a serial bus serving as an example of the network, and an address, which is indicative of a place from which the data are to be read in the data transmitting apparatus are described in an address space having a width of 64 bits based on the IEEE 1212 standard. The IEEE 1394 also stipulates that the upper 10 bits in the address space represent a bus ID (i.e., identification information by which the respective serial buses for serially connecting the apparatuses are identified with each other), the subsequent 6 bits represent a apparatus number (i.e., identification information by which the apparatuses serially connected are identified with each other, and information of the 16 bits, i.e., the combination of the bus ID and the apparatus number, represents a apparatus ID.

The subsequent 48 bits by which the apparatus ID is followed serve as an address space, which is indicative of storage locations in a memory included in the apparatus provided with the above-mentioned apparatus ID. A region of the memory, which corresponds to the upper 20 bits in the address space of 48 bits, is divided into a private space, which can be utilized freely for a closed (i.e., completed) request of reading in the apparatus, and an initial address used for information interchange between the apparatuses.

In addition, in the address space of 28 bits by which the above-mentioned 20 bits are followed, the region, which is shown in the left-hand side of FIG. 1, between the address of "0900 h" (wherein "h" being indicative of hexadecimal) and the address of "09FFh" is stipulated as a region for the above-mentioned plug register defined in the IEC-61883 Part 1 standard.

The concept of "plug" is substantialized in the plug register, in order to form a signal path, which is logically analogous to the conventional analog interface, when making a control of the data transmission to the respective apparatuses, which are connected through the serial bus and the interfaces of the respective apparatuses that are connected by that serial bus.

As shown in FIG. 1, each of the apparatuses is provided with the oPCR 11 having an attribute of the output plug and the iPCR 13 having an attribute of the input plug. In addition, the apparatus includes an output master plug register (hereinafter referred to as the "oMPR") 10 and an input master plug register (hereinafter referred to as the "iMPR") 12, which are indicative of informations of the inherent output and input plugs of the apparatus, respectively.

Each of the apparatuses does not include two or more oMPR 10 and two or more iMPR 12. However, each of the apparatuses may include two or more oPCR 11 and two or more iPCR 13.

More specifically, each of the oPCR 110 and the iPCR 130 may be provided at the maximum number of 31, as shown in FIG. 1. The flow of the data serving as the isochronous data between the apparatuses in which the connection is established is controlled by updating the respective plug registers corresponding to these plugs.

The above-mentioned oPCR 110 and iPCR 130 are stipulated as the register spaces having the width of 32 bits, respectively. Each of the register spaces is divided into a plurality of fields.

Now, the data format, which is indicative of the contents of description of the above-mentioned oPCR 110 and iPCR 130 will be described more concretely with reference to FIGS. 2 and 3.

As shown in FIG. 2, the oPCR 110 is composed of an on-line flag 21, a broadcast connection counter 22, a p2p connection counter (hereinafter referred to as the "p2p counter") 23, a spare information 24 for future expanded capability, a channel number 25, a data transmission speed 26, an overhead ID 27 and a pay load 28. The on-line flag 21 is indicative of a state in which the connection of the output plug corresponding to the oPCR 110 is kept in "ON" or "OFF" condition. The broadcast connection counter 22 is indicative of the number of broadcast connection, which is formed via the output plug corresponding to the oPCR 110. The p2p counter 23 is indicative of the number of p2p connection, which is formed via the output plug corresponding to the oPCR 110. The channel number 25 is indicative of the number of channel utilized for transmission of the isochronous data. The data transmission speed 26 is indicative of the transmission speed when transmitting the data. The overhead ID 27 is indicative of an amount of overhead to be added to the isochronous data. The pay load 28 is indicative of an amount of data of the isochronous data to be transmitted per cycle.

As shown in FIG. 3, the iPCR 130 is composed of an on-line flag 31, a broadcast connection counter 32, a p2p counter 33, spare informations 34 and 36 for future expanded capability and a channel number 35. The on-line flag 31 is indicative of a state in which the connection of the input plug corresponding to the iPCR 130 is kept in "ON" or "OFF" condition. The broadcast connection counter 32 is indicative of the number of broadcast connection, which is formed via the input plug corresponding to the iPCR 130. The p2p counter 33 is indicative of the number of p2p connection, which is formed via the output plug corresponding to the oPCR 110. The channel number 35 is indicative of the number of channel utilized for transmission of the isochronous data.

With respect to change in the contents of description of the above-mentioned oPCR 110 and iPCR 130, the apparatus provided with the oPCR 110 or iPCR 130 having the contents of description to be changed, can make such a change per se, and the other apparatus than the above-mentioned apparatus can issue a lock-transaction through the bus of the IEEE 1349 standard, to make a change in the contents of description.

When the contents of description of the respective PCR is changed through the lock-transaction, the data to be subjected to change in the contents of description are transmitted from the apparatus on the requesting side to the other apparatus on the response side, the thus transmitted data are processed with the use of the predetermined address space in the apparatus on the response side, and then, the processing is carried out in accordance with the procedures of comparing and swapping for reply to the apparatus on the requesting side.

Now, the procedures of comparing and swapping will be described below with reference to FIG. 4. As shown in FIG. 4, the apparatus 40 through which the lock-transaction is to be executed, transmits a request packet having the contents of description in which the current value of the plug register in the apparatus 41 in which the contents of description of the plug register are to be changed, is described as "arg_value", and a value after completion of change is described as "data_value", to the above-mentioned apparatus 41 through the serial bus.

The apparatus 41, which has received the request packet, compares the value of "arg_value" in the request packet received with the current value of the plug register to be changed in the apparatus 41. When there is obtained a comparison result that these values are identical to each other, the apparatus 41 rewrites the value of the plug register from the value "arg_value" into the value "data_value" as described in the request packet transmitted (see (1) in FIG. 4). When there is obtained s comparison result that these values are different from each other, the apparatus 41 performs a processing of making no change (see (2) in FIG. 4), on the other hand.

Then, the apparatus 41 sends the response packet in which the value of the plug register in the apparatus 41 at the time when receiving the above-mentioned request packet is described as "old_value" (Note: the value is "X" in the case of (1) in FIG. 4, and the value is "Z" in the case of (2) in the same figure), to the apparatus 40 through the serial bus. The apparatus 40, which has received the response packet, compares the value of "old_value" of the response packet as received with the value of "arg_value" described in the request packet, which has previously been sent by the apparatus 40 itself. When there is obtained a comparison result that these values are identical to each other, the apparatus 40 judges that the change was completed successfully (see (1) in FIG. 4). When there is obtained a comparison result that these values are different from each other, the apparatus 40 judges that the change was failed (see (2) in FIG. 4), on the other hand.

Now, description will be given below with reference to an example as shown in FIG. 5 of the flow of concrete processing, which is executed when establishing the p2p connection through the above-mentioned lock-transaction, as well as the flow of concrete processing for disconnecting the p2p connection.

As exemplified in FIG. 5, it is assumed that three apparatuses 50 to 52 are connected on a serial bus 53 serving as a high-speed serial bus. Here, it is also assumed that the apparatus 50 is logically provided with an input plug 500 for the input of data, the apparatus 51 is logically provided with an output plug 510 for the output of data and the apparatus 52 is logically provided with an input plug 520 for the input of data. In this case, the isochronous data can be sent to the serial bus 53 through the output plug 510 of the apparatus 51 and the other apparatuses 50 or 52 can receive the isochronous data through the input plug 500 or 520 of the other apparatus 50 or 52, respectively, thus achieving the transmission of the data.

Each of the apparatuses 50 to 52 is logically provided with an oPCR for controlling an attribute of the output plug defined based on the IEC-61883 Part 1 standard, an iPCR for controlling an attribute of the input plug, and a p2p counter, which is indicative of the number of establishment of the p2p connection.

More specifically, in case as shown in FIG. 5, the apparatus 50 has the iPCR 501, the apparatus 51 has the oPCR 511 and the apparatus 52 has the iPCR 521. The iPCR 501 has the p2p counter 502, the oPCR 511 has the p2p counter 512 and the iPCR 521 has the p2p counter 522. Description will be given below of the example as shown in FIG. 5 in which each of the apparatuses 51 and 50 has a function as a controller for the data transmission utilizing the serial bus 53 and two p2p connections (as shown in broken lines in FIG. 5) are formed with the use of the same channel in the above-mentioned serial bus 53.

Now, operation will be described below.

First, the apparatus 50 having the function as the controller obtains the channel 54 and the required band from an IRM (Isochronous Resource Manager). In FIG. 5, the above-mentioned channel 54 for the data transmission is shown imaginarily in the serial bus 53.

In case of the connection mode as shown in FIG. 5, the apparatus 50 first makes a control to increment the p2p counter 512 of the oPCR 511 in the apparatus 51 on the transmitting side by "1". In addition, the apparatus 50 makes a control to increment the p2p counter 502 of the iPCR 501 in the apparatus 50 itself on the receiving side by "1". This establishes the p2p connection, as shown in broken line on the left-hand side in FIG. 5, for the data transmission from the apparatus 51 to the apparatus 50, to transmit the data from the apparatus 51 to the apparatus 50 through the channel 54.

In case of establishing the p2p connection, as shown in broken line on the right-hand side in FIG. 5, for the data transmission from the apparatus 51 to the apparatus 52, the apparatus 51 having the function as the controller makes a control to increment the p2p counter 512 of the oPCR 511 of the apparatus 51 itself by "1". Accordingly, the total amount in the p2p counter 512 of the oPCR 511 in the apparatus 51 becomes "2", including the case of the p2p connection, as shown in broken line on the left-hand side in FIG. 5, from the apparatus 51 to the apparatus 50.

Further, the apparatus 51 makes a control to increment the p2p counter 522 of the iPCR 521 in the apparatus 52 on the receiving side by "1". In this case, the existence of the p2p connection in the oPCR 511 of the apparatus 51 on the transmitting side, as shown in broken line on the left-hand side in FIG. 5, from the apparatus 51 to the apparatus 50, makes it possible to establish a new p2p connection, utilizing the current channel 54 and the band, without obtaining any other channel and any required band. Two or more p2p connections may be established in the same PCR in the same manner as the oPCR 511 of the apparatus 51.

Accordingly, there are two cases, i.e., the one case where the establishment of the p2p connection in a certain apparatus is made by the apparatus itself, and the other case where that the other apparatus causes a certain apparatus to make establishment of the p2p connection. In any one of these cases, the value of the p2p counter 512, etc. of the PCR in the certain apparatus is identical to the total amount of them.

Release of the p2p connection as already established is controlled by subtracting, by "1", the value of the p2p counter 512 of the PCR in the apparatus or the other apparatus, which value is a resultant from the increment by any apparatus having the function as the controller in the above-mentioned p2p connection.

The p2p connection is established among the apparatuses 50 to 51, which are connected to each other by the serial bus 53, to transmit the data in this manner.

The embodiments of the present invention will be described based on the contents as described above of the p2p connection.

II First Embodiment

Now, description will be given below of the first embodiment of the present invention, which is to be worked based on the above-mentioned IEEE 1394 standard.

Figure 6:
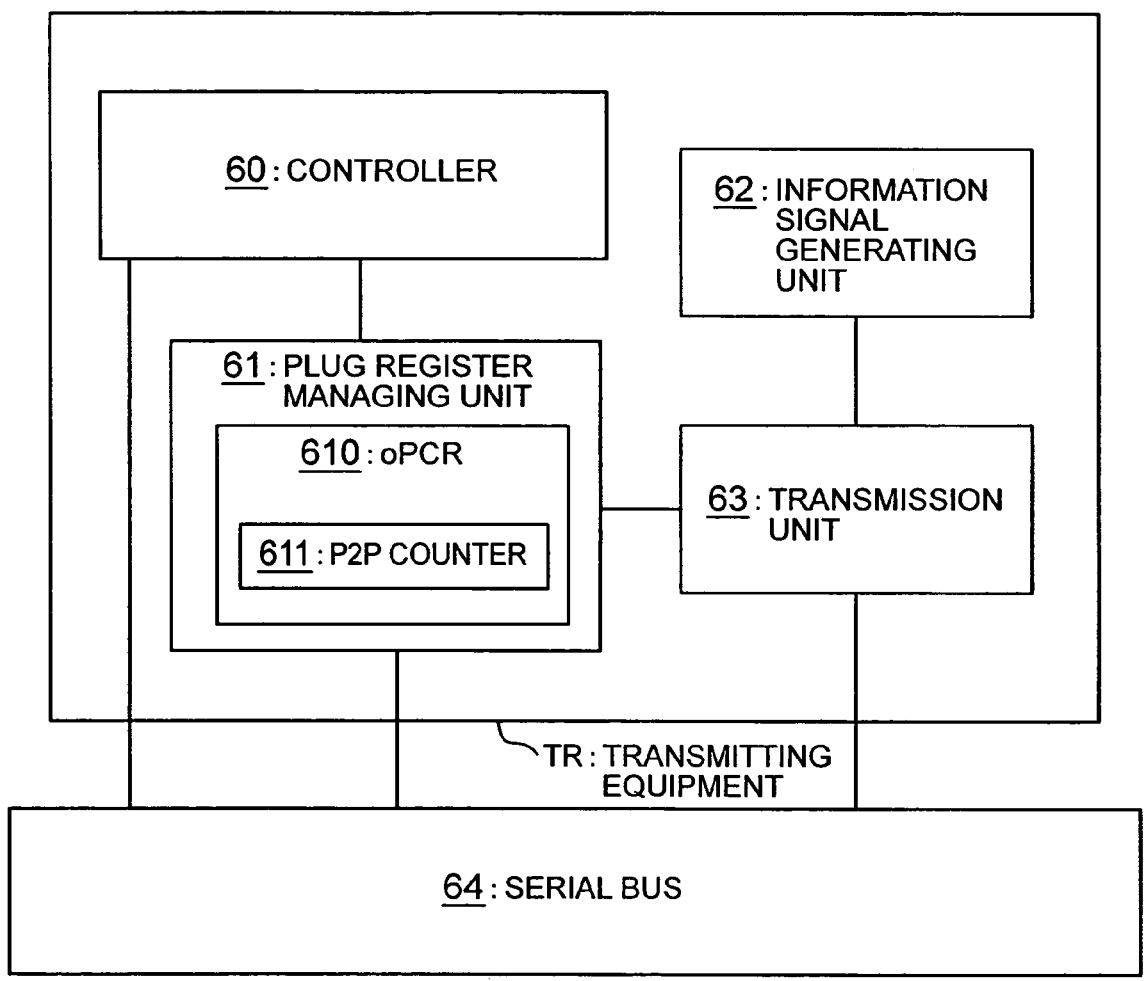
FIG. 6 is a block diagram illustrating a schematic configuration of a transmitting apparatus according to the embodiment of the present invention.

First, the configuration of the transmitting apparatus TR according to the first embodiment of the present invention, which is connected to the serial bus 64, will be described with reference to FIG. 6. FIG. 6 is a block diagram illustrating the schematic configuration of the transmitting apparatus TR.

As shown in FIG. 6, the transmitting apparatus TR includes a controller 60; a plug register managing unit 61, which serves as a reception device, a judgment device, a storage device, the number of established connection for each connected processing apparatus calculating device and a protection device; an information signal generating unit 62 and a transmission unit 63.

The plug register managing unit 61 is logically provided with the oPCR 610, which is indicative of the attribute of the output plug. In addition, the oPCR 610 is logically provided with the p2p counter 611, which is indicative of the number of establishment of connection.

Now, the whole operation will be described below.

The controller 60 serves when the transmitting apparatus TR causes the p2p connection with the other apparatus connected through the serial bus 64 to be established, and controls over the establishment of the above-mentioned p2p connection.

The plug resister managing unit 61 conducts transmission or reception of control signals relative to the other apparatus not shown in FIG. 6, through the controller 60 and the serial bus 64, and further performs the update processing of the oPCR 610. In addition, the plug register managing unit 61 gives instructions to start or halt the transmission of the isochronous packet data in the transmission unit 63.

The information signal generating unit 62 is a block for generating information to be transmitted, which includes audio information or video information. The transmission unit 63 forms the isochronous packet based on the information from the information signal generating unit 62, and transmits it through the serial bus 64 under the instructions from the plug register managing unit 61.

Now, operation of the embodiment of the present invention will be described in detail below.

In the embodiment of the present invention, there will be described the operation for establishing the p2p connection or disconnecting it by updating the oPCR 610.

First, the controller 60 causes the transmitting apparatus TR to establish the p2p connection with the other apparatus not shown, which is connected to the serial bus 64. More specifically, the controller 60 makes a request for establishment of the p2p connection to the other apparatus, in which the p2p connection is to be established as mentioned above, receives a response of a successful request from the other apparatus, and sends the control signals to update the oPCR 610 of the plug register managing unit 61.

The plug register managing unit 61 receives the control signals having the contents of the requests for updating the plug register, from the other apparatus through the controller 60 and the serial bus 64. Of the requests for update, the request for disconnecting the p2p connection corresponds to the disconnection request according to the present invention.

The plug register managing unit 61 judges, from the contents of request included in the control signals, as whether or not the request for update is based on the IEC-61883 Part 1 standard. When there is judged that the disconnection request is based on that standard, the plug register managing unit 61 updates the value of register. The establishment of the p2p connection between the transmitting apparatus TR and the other apparatus or disconnection thereof is made based on the updated value of the plug register. The update processing will be described later.

When there is judged that the request for update as received is the disconnection request of the p2p connection and is not based on the IEC-61883 Part 1 standard, the plug register managing unit 61 executes the predetermined protection processing. The protection processing will also be described later.

Figure 7:
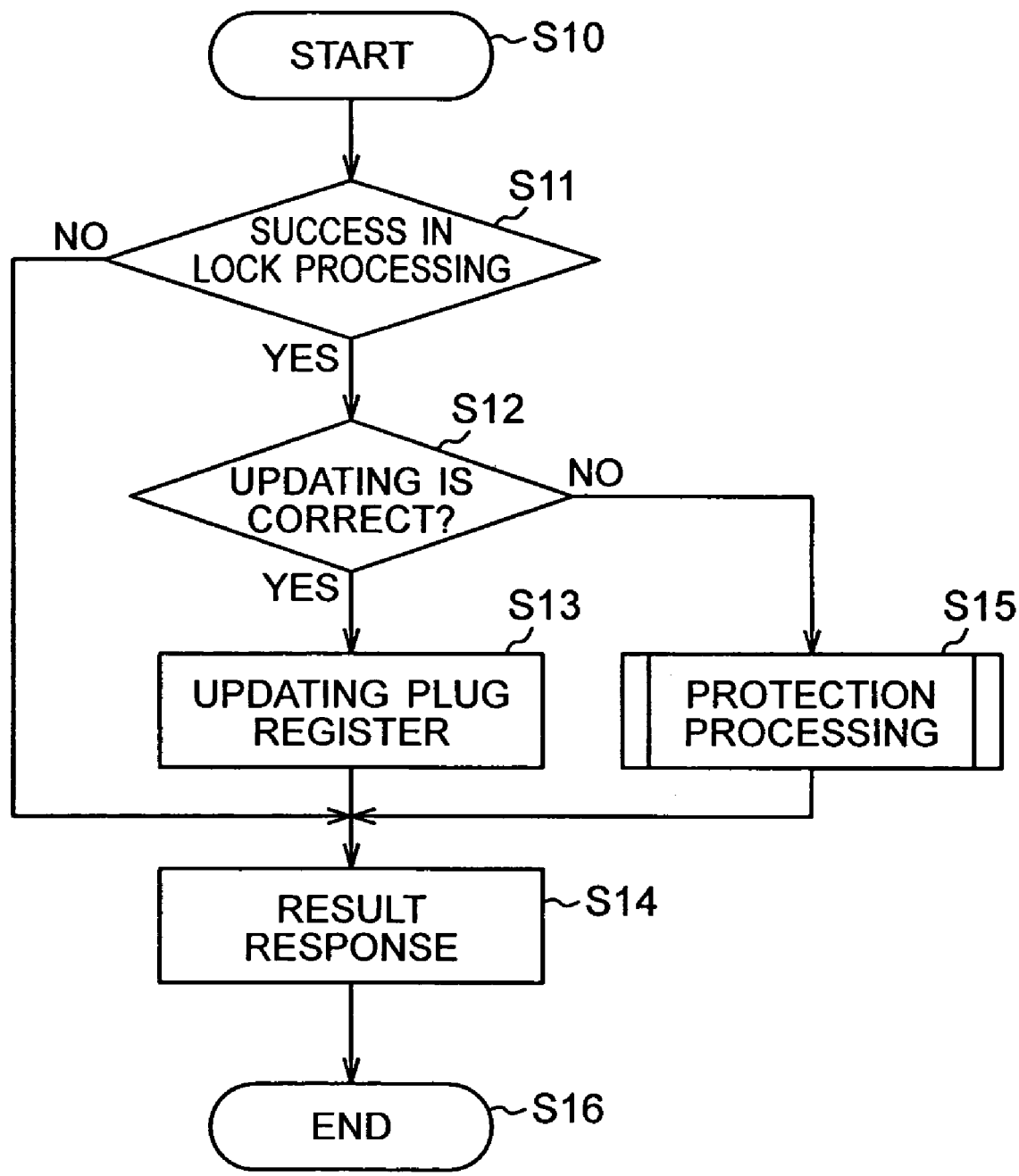
FIG. 7 is a view illustrating an update processing of a plug register according to the embodiment of the present invention.

Now, the whole update processing of the plug register according to the present invention will be described with reference to FIG. 7. FIG. 7 is a flowchart showing the update processing of the plug register.

First, the plug register managing unit 61 receives the request for update of the plug register concerning the oPCR 610, and judges as whether or not the lock-transaction required for the request for update (hereinafter referred to as the "lock processing") is successful (Step S11).

More specifically, with respect to the lock processing, there is made a comparison between the "arg_value" of the request packet as received and the current value of the oPCT 610 in the above-described procedures of comparing and swapping. When these values are identical to each other, it is judged that the lock processing has been successful. When these values are different from each other, it is judged that the lock processing has ended in failure.

In case where it is judged that the lock processing has ended in failure (YES in Step S11), the plug register managing unit 61 then judges as whether or not the request for update of the plug register is correct (Step S12). With respect to judgment in correctness, the request for update, which is made from the apparatus based on the above-mentioned IEC-61883 Part 1 standard, is judged to be correct, on the one hand, and the request for update, which is made from any other apparatus that is not based on the above-mentioned standard, is judged to be incorrect, on the other hand. A concrete judgment in Step S12 will be described later.

In case where it is judged that the request for update of the plug register is correct (YES in Step S12), the plug register managing unit 61 updates the oPCR 610 based on the contents of the request for update (Step S13).

Then, the plug register managing unit 61 sends the result of update in Step S13 to the apparatus, which made the corresponding request for update (Step S14), and the series of processing is completed (Step S16). Such a series of processing enables the p2p connection according to the request for update to be established or disconnected.

When it is judged in Step S12 that the request for update is incorrect (No in Step S12), a protection processing described later is executed, without updating the oPCR 610 (Step S15), and a series of processing is completed (Step S16). The series of processing protects the p2p connection according to the request for update, leading to no disconnection.

When it is judged in Step S11 that the lock processing has ended in failure (YES in Step S11), the judgment result is sent to the apparatus, which made the corresponding request for update (Step S14) and the series of processing is completed (Step S16).

[A] Embodiment of Judgment Processing of Correctness of Request For Update

Figure 8:
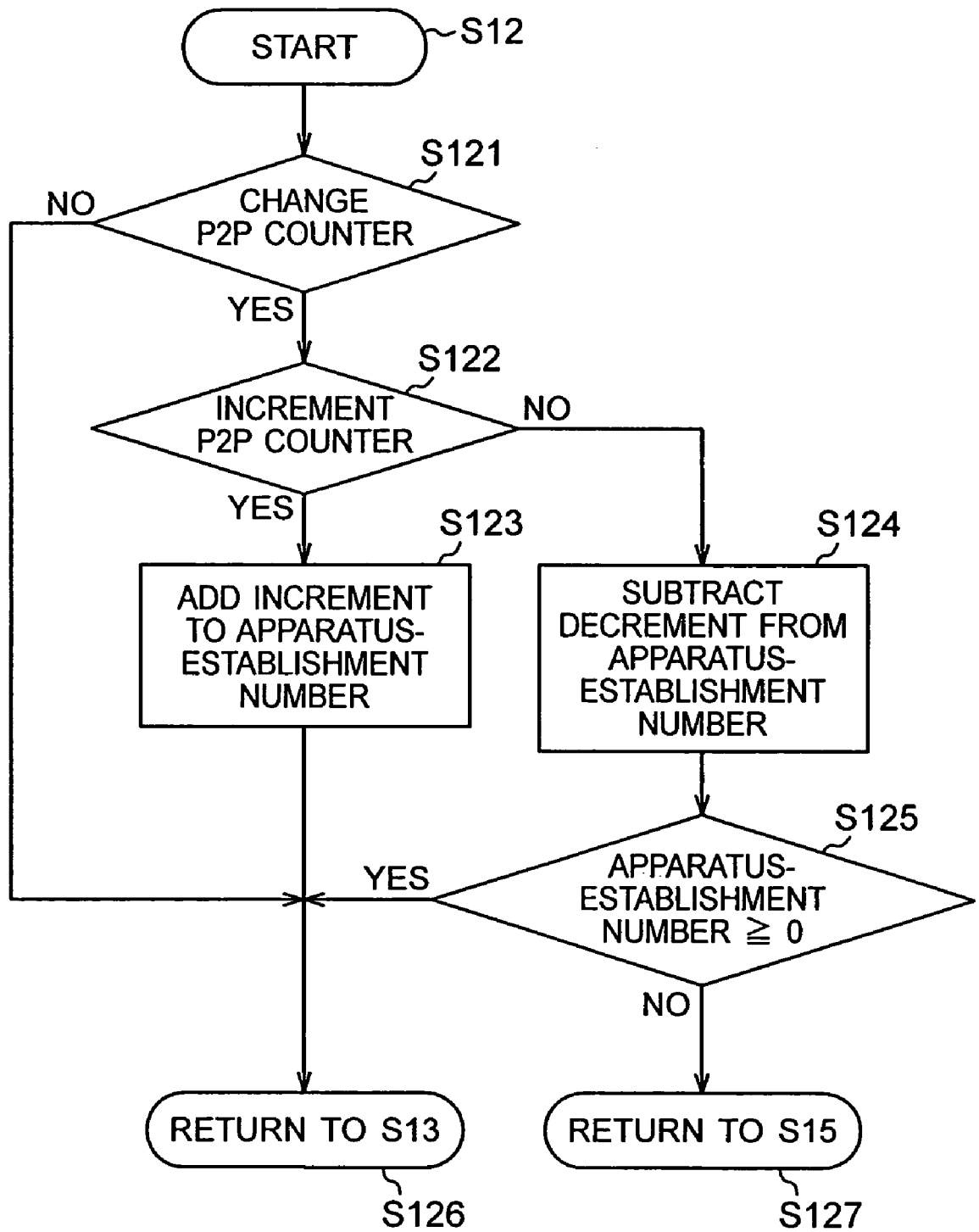
FIG. 8 is a flowchart showing a judgment processing, according to the first embodiment of the present invention, as whether or not the request for update is correct.

Now, judgment in Step S12 as shown in FIG. 7 will be described concretely with reference to FIG. 8. FIG. 8 is a flowchart showing the judgment processing, according to the embodiment of the present invention, as whether or not the request for update is correct. The plug register managing unit 61 mainly executes the judgment processing.

The judgment processing according to the embodiment of the present invention is to count the number of p2p connection established between the transmitting apparatus TR and the other apparatus, for each apparatus, which made the request for establishment of connection, and judge the correctness in accordance with variation of the number of connection established. Accordingly, the concept of the "number of established connection for each connected processing apparatus" for the transmitting apparatus TR is utilized, as the number of p2p connection established for each of the other apparatuses connected through the serial bus 64, in judgment of the correctness.

In the judgment of correctness as shown in FIG. 8, it is judged whether or not the request for update of the plug register includes change in the p2p counter 611 of the transmitting apparatus TR (Step S121).

In case where it is judged that the request for update does not include change in the p2p counter 611 (NO in Step S121), the request for update is judged to be correct, and the processing enters Step S13 as shown in FIG. 6. More specifically, when the request for update does not includes change in the p2p counter 611, no change therein leads to no relationship between the request for update and the p2p connection, with the result that such a request is judged as the request for update for the broadcast connection. The broadcast connection enables any other apparatus than the apparatus, which establishes the connection, to carry out the disconnection. Accordingly, it is judged that such a request is correct and satisfies the standard.

In case where it is judges in Step S121 that the request for update includes change in the p2p counter 611 (YES in Step S121), and namely that the request for update is a request of the p2p connection, on the other hand, it is then judged as whether or not the request for update includes increment in the p2p counter 611 (Step S122). When it is judged that the request for update includes the increment in the p2p counter 611, and namely that such a request is a request for establishment of the p2p connection (YES in Step S122), an increment (e.g. of "1") due to the establishment is added to the number of established connection for each connected processing apparatus of the corresponding apparatus (Step S123) and then the processing enters Step S13 as shown in FIG. 7.

In case where it is judged in Step S122 that the request for update includes no increment in the p2p counter 611, and namely, the request for update is a request for disconnection of the p2p connection, (NO in Step S122), on the other hand, a decrement (e.g. of "1") due to the disconnection is subtracted from the number of established connection for each connected processing apparatus of the corresponding apparatus (Step S124).

After subtraction in Step S124, it is judged as whether or not the number of established connection for each connected processing apparatus is any one of "null" and a positive number (Step S125). At this stage, it is judged from the judgment in Step S125 that the request for update, in which the number of established connection for each connected processing apparatus is a negative number, is to disconnect the connection by any apparatus in which the p2p connection has not been established at that time. Accordingly, in the embodiment of the present invention, such a request for update is judged to be incorrect.

When the number of established connection for each connected processing apparatus is judged as any one of "null" and a positive number (YES in Step S125), the request for update is judged to be correct and then the processing enters Step S13 as shown in FIG. 7.

When the number of established connection for each connected processing apparatus is judged as a negative number (NO in Step S125), it is judged that the request for update is not correct, and namely that such a request for update, which was made by the other apparatus than the apparatus having establishment of the p2p connection and does not satisfy the IEC-61883 Part 1 standard, and then the processing enters Step S15 as shown in FIG. 7.

There is a case where the number of established connection for each connected processing apparatus in the above-mentioned embodiment of the present invention may be stored for each of the apparatuses, which perform transfer and reception of information relative only to the apparatus and establish another connection to the other apparatus to perform transfer and reception of information relative thereto.

[B] Embodiment of Protection Processing of p2p Connection

Now, description will be given below of the protection processing of the p2p connection, which is to be performed in Step S15 when it is judged that the request for update does not satisfy the IEC-61883 Part 1 standard.

When it is judged that the request for update of the plug register, which was made by the other apparatus that does not satisfy the above-mentioned standard, it is necessary to protect the p2p connection to be subjected to the request for update. In the embodiment of the present invention, a bus reset is generated to perform the protection processing.

Figure 9:
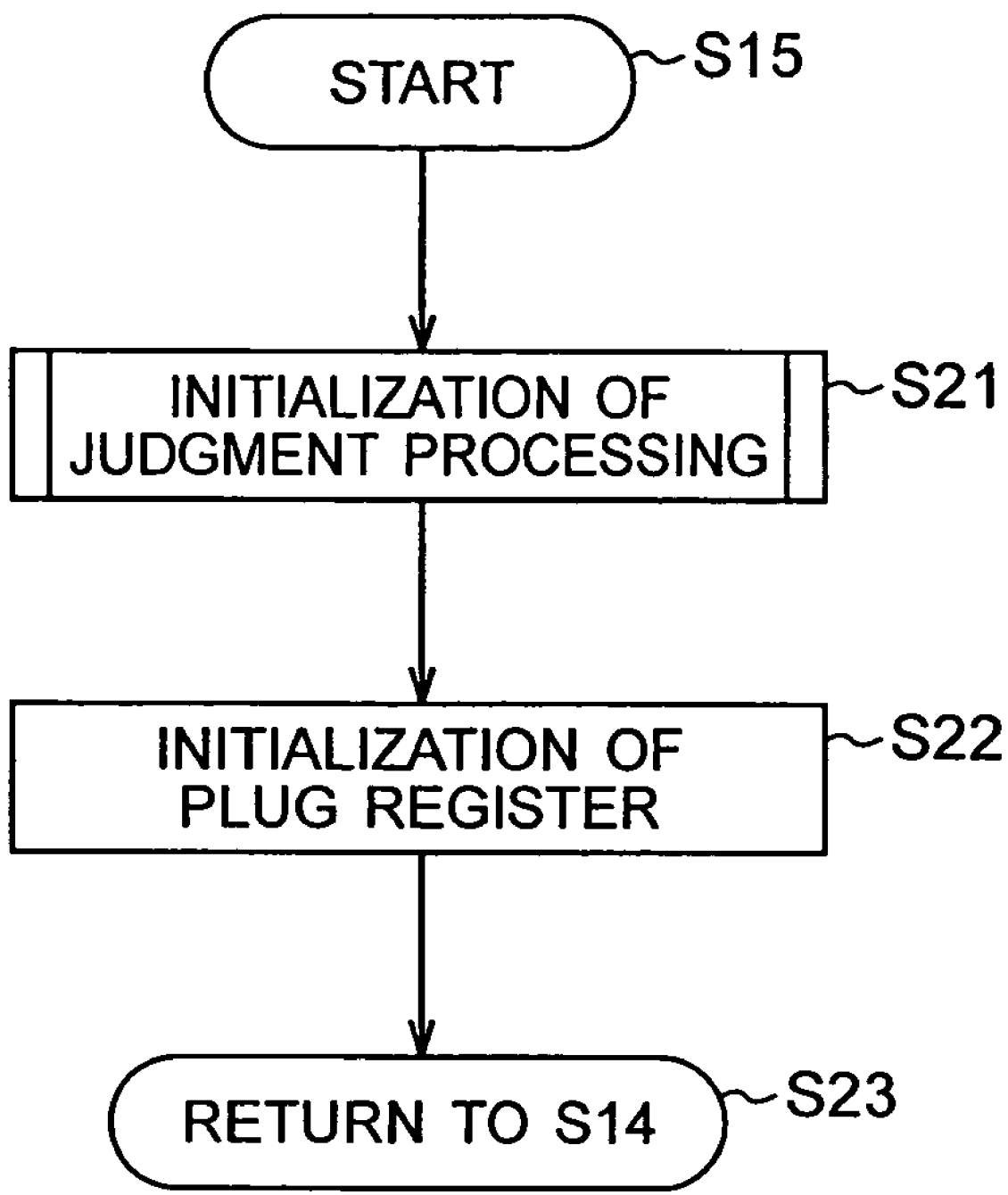
FIG. 9 is a view illustrating an initialization processing flow when a bus reset generates in the embodiment of the present invention.
Figure 10:
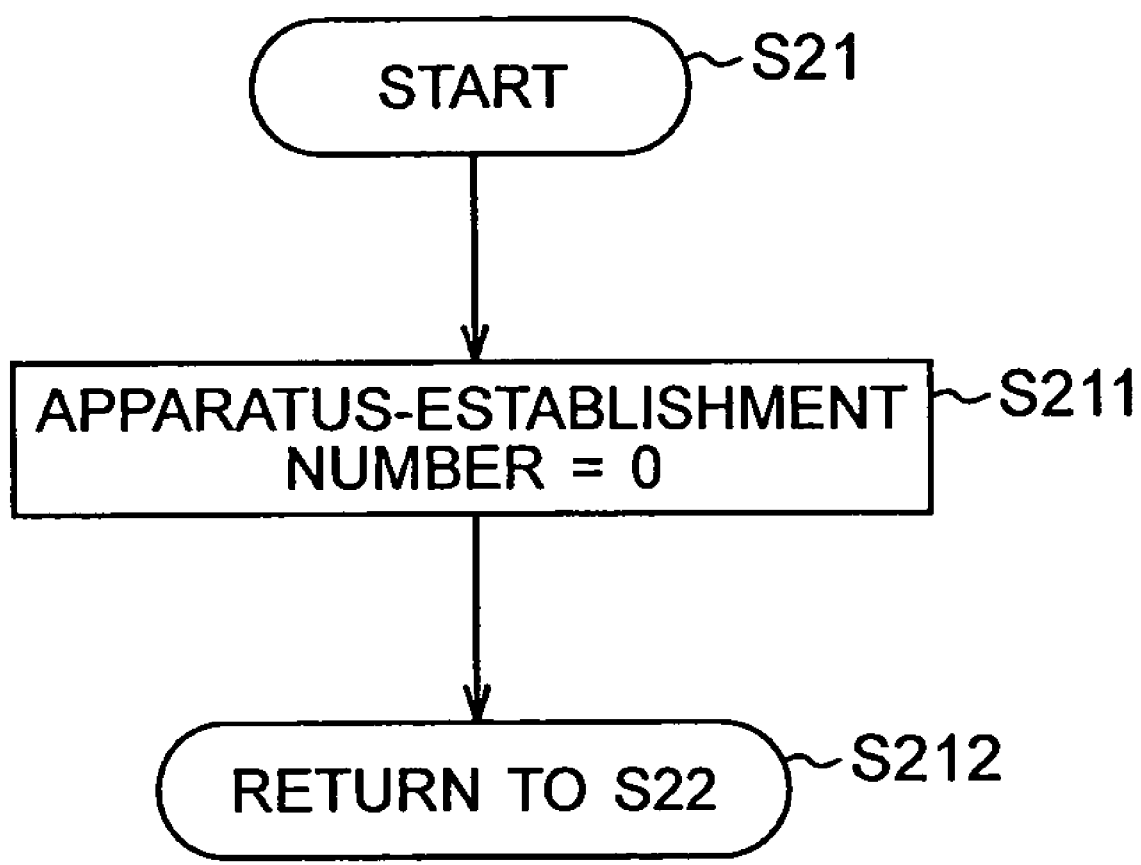
FIG. 10 is a view illustrating initialization of the judgment processing for correctness of the request for update, when the bus reset generates in the first embodiment of the present invention.

Now, an initialization processing, which is to be executed when the bus reset is generated to perform the protection processing of Step S15 as shown in FIG. 7, will be described below with reference to FIGS. 9 and 10. FIG. 9 is a view illustrating an initialization processing flow when the bus reset generates, and FIG. 10 is a view illustrating initialization of the judgment processing for correctness of the request for update, when the bus reset generates.

As shown in FIG. 9, when the bus reset generates to perform the protection processing of Step S15, the judgment processing for correctness of the request for update itself is initialized (Step S21). More specifically, the initialization processing is executed to set all of the number of established connection for each connected processing apparatus as "null" as shown in FIG. 10 (Step S211), in the embodiment of the present invention.

Turning to FIG. 9, after the completion of initialization of the judgment processing for correctness of the request for update, the plug register is initialized (Step S22), and then the processing enters Step S14 as shown in FIG. 7 (Step S23).

Then, the above-described judgment processing (Step S12, etc.) is executed based on the initialization processing as shown in FIG. 9.

The processing order of the above-mentioned Step S21 and Step S22 may be varied optionally. More specifically, the initialization of the judgment processing may be executed after completion of initialization of the oPCR 610. Alternatively, these processings may be executed simultaneously.

In this case, the plug register (including oPCR 610) is initialized with the bus reset, without executing any update of the oPCR 610. The IEC-61883 Part 1 standard stipulates that a mode of connection, which has been established prior to the bus reset, is recovered within a second after generation of the bus reset.

The transmitting state of the isochronous data is kept in the same state as that prior to the generation of the bus reset, within a second after the generation of the bus reset. As a result, the transmission of the isochronous data is not interrupted immediately before and after the generation of the bus reset. Accordingly, the generation of the bus reset makes it possible to protect the p2p connection to avoid any problem in transfer and receipt of the data.

In the embodiment of the present invention, it is judged as whether or not the request for update of the p2p connection, which was made by the other apparatus connected through the serial bus 64, satisfies the predetermined standard, and when the standard is not satisfied, no response to the request for update is made, thus protecting the p2p connection from any request for update, which was made by any incorrect non-standardized apparatus.

In addition, the judgment according to the present invention is applicable to a case where, although the other apparatus connected to the serial bus 64 is based on the IEC-61883 Part 1 standard, a communication error may cause for some reasons. More specifically, there is a possibility that the p2p connection as already established may be interrupted in accordance with an erroneous request for update due to transmission error. In such a case, even when the transmitting apparatus TR received the erroneous request for update due to the transmission error, the plug register managing unit 61 judges that the request for update in which the number of established connection for each connected processing apparatus is a negative number, is to disconnect the connection by any apparatus in which the p2p connection has not actually been established at that time, with the result that no response to the request for update is made. It is therefore possible to avoid an erroneous update of the plug register due to the transmission error, thus protecting the p2p connection.

In addition, the number of the p2p connection with the other apparatus is counted for each of the apparatus, and it is judged whether or not the request for update satisfies the standard, on the basis of the counted number. It is therefore possible to protect the p2p connections with all the apparatuses as connected, irrespective as whether that connection is established by the other apparatus or the transmitting apparatus.

When it is judged that any other apparatus by which the request for update of the plug register was made does not satisfy the IEC-61883 Part 1 standard, the bus reset generates, thus making it possible to protect the existing p2p connection to avoid any problem in transfer and receipt of the data.

In the protection processing of the p2p connection in the embodiment of the present invention, another protection processing described below may be substituted for the above-mentioned bus reset generation processing.

First, there may be executed a processing of making no response to an incorrect request for update of the p2p connection. More specifically, when the request for update is judged to be nonstandardized and incorrect, the plug register managing unit 61 of the transmitting apparatus TR does not update the oPCR 610 and makes no response to the apparatus by which the incorrect request for update was made.

The above-mentioned processing ensures the protection of the existing p2p connection already established, without interruption thereof.

In this case, no processing is executed in Step S14, after the protection processing in Step S15 as shown in FIG. 7, leading to completion of the processing.

Second, there may be executed a processing of making a response of success in the request for disconnection, to the request for update of the p2p connection, without disconnecting the above-mentioned p2p connection. In this case, the transmitting apparatus TR does not execute any update of the oPCR 610 in Step S15 as shown in FIG. 7, on the one hand, and a response packet in which the value of "arg_value" of the request packet received from the apparatus, by which the request for update was made, is changed to the value of "old_value", is sent in the result response processing in Step S14. The apparatus, which received such a response packet (i.e., the apparatus from which the request for update was sent) compares the "old_value" of the response packet as received with the "arg_value", which was sent by the own apparatus, to judge that the update has been successful, because these values are identical to each other. In this case, it is possible to protect the existing p2p connection, and reduce the possibility that the apparatus, which sent the incorrect request for update, makes a further incorrect and non-standardized request for update to the transmitting apparatus TR, thus providing useful technical effects.

Third, there may be executed a processing of making a response of failure in the request for disconnection, to the request for update of the p2p connection, without disconnecting the above-mentioned p2p connection. In this case, no update of the oPCR 610 is executed in Step S15 as shown in FIG. 7, and there may be performed, in the result response processing in Step S14, a processing of making either a response in which the value of "old_value" is changed to a different value from the actual register value, or a response having a response code of "resp_conflict_error", which is indicative of disablement in update of the data.

The controller 60 is not essential in the embodiment of the present invention. The present invention is therefore applicable to an apparatus provided with no controller 60 for the transmitting apparatus, i.e., an apparatus, which provides no establishment of the p2p connection for itself, and has only a function of enabling establishment of the p2p connection upon a request from the other apparatus.

III Second Embodiment

Now, description will be given below of the second embodiment of the present invention.

The second embodiment is to protect the p2p connection, which was established by the transmitting apparatus for itself, against a request for disconnection of the p2p connection made by the other apparatus.

Figure 11:
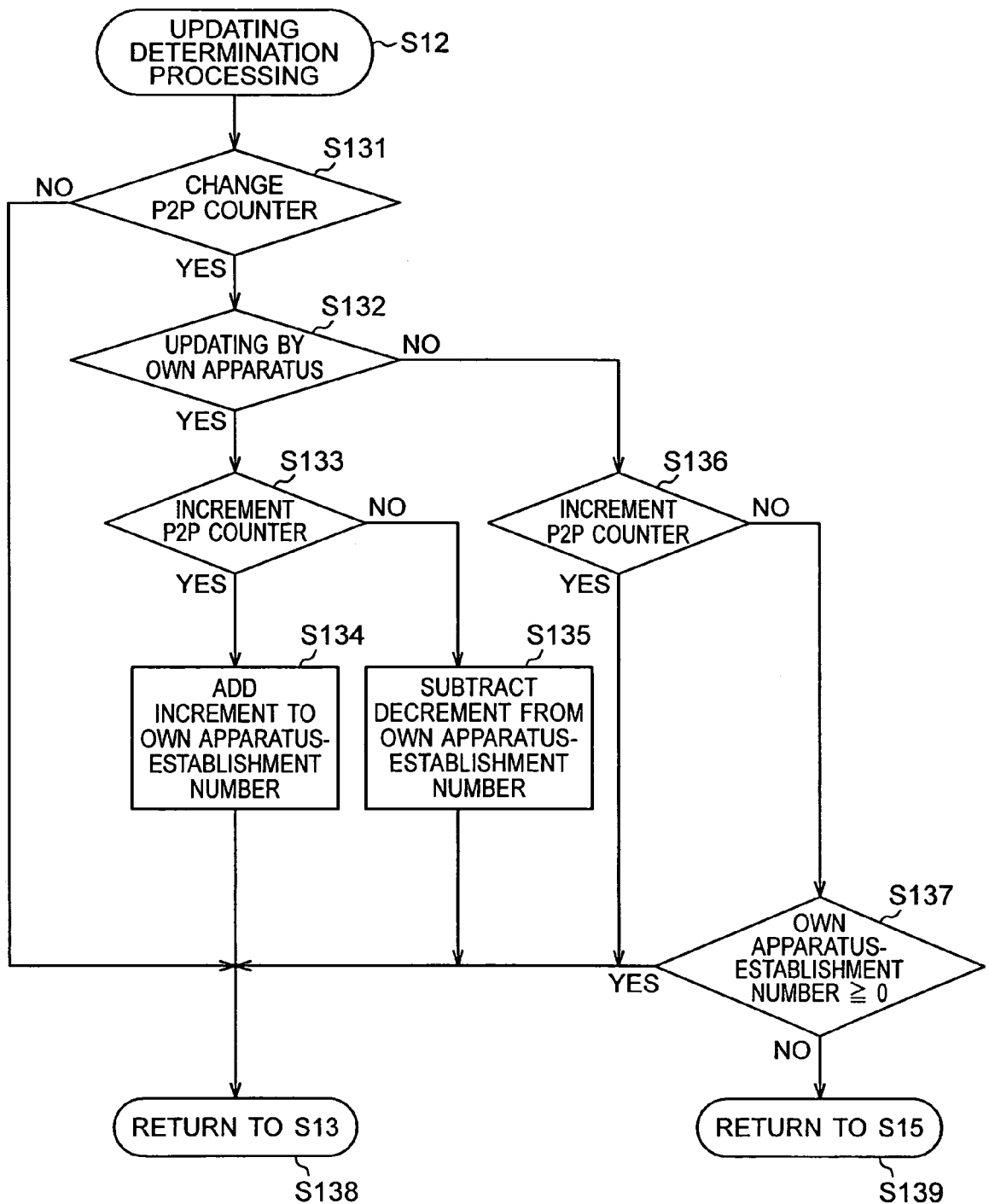
FIG. 11 is a flowchart showing a judgment processing, according to the second embodiment of the present invention, as whether or not the request for update is correct.
Figure 12:
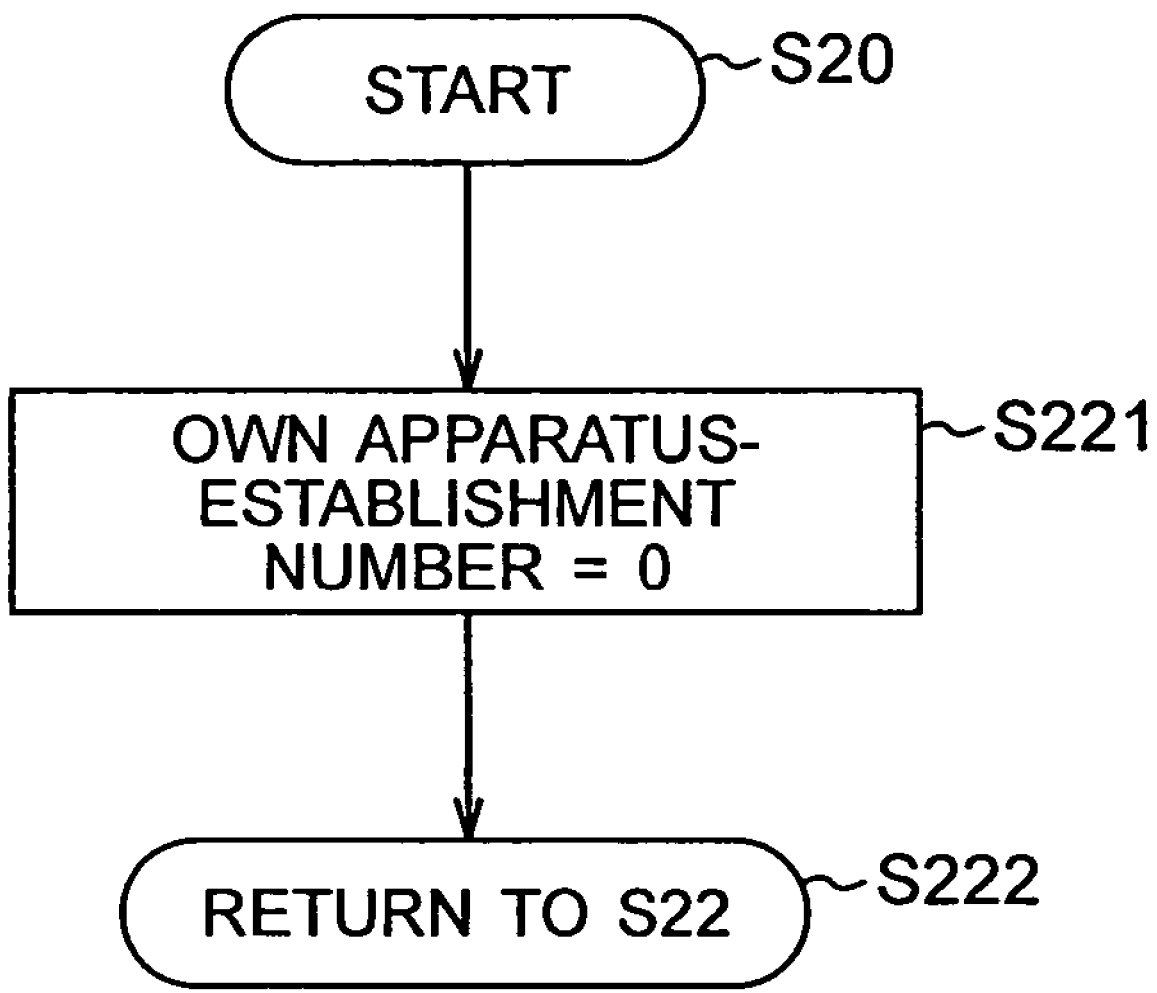
FIG. 12 is a view illustrating initialization of the judgment processing for correctness of the request for update, when the bus reset generates in the second embodiment of the present invention.

The configuration of the transmitting apparatus according to the second embodiment of the present invention and the update processing of the plug register are the same as those in the first embodiment as described above of the present invention, and detailed description thereof is omitted. The judgment processing for correctness of the request for update, which is a characterized feature in the second embodiment of the present invention, will be described below with reference to FIGS. 11 and 12. FIG. 11 is a flowchart showing the judgment processing, according to the second embodiment of the present invention, as whether or not the request for update is correct, and FIG. 12 is a view illustrating initialization of the judgment processing for correctness of the request for update, when the bus reset generates in the second embodiment of the present invention.

First, the judgment processing in Step S12 as shown in FIG. 7 will be described with reference to FIG. 11. In the second embodiment of the present invention, the plug register managing unit 61 serves as the reception device, the judgment device, the storage device, the number of self-established connection calculating device and the protection device.

In the judgment processing in the embodiment of the present invention, the plug register managing unit 61 counts the number of the p2p connection established by the transmitting apparatus TR by itself, and make a judgment of correctness on the basis of variation of the number. Accordingly, the judgment utilizes the concept of the number of the p2p connection established by the transmitting apparatus TR by itself, i.e., the number of self-established connection.

First, it is judged as whether or not the request for update of the plug register includes change in the p2p counter 611 of the transmitting apparatus TR (Step S131), as shown in FIG. 11.

In case where it is judged that the request for update of the plug register includes no change in the p2p counter 611 (NO in Step S131), the request for update is judged to be correct, and the processing enters Step S13 as shown in FIG. 7. More specifically, no change in the p2p counter 611 means that the request for update does not relate to the p2p connection, but relates to the broadcast connection. It is reasonable to judge that such a request for update is standardized and correct, because the broadcast connection enables any other apparatus than the apparatus, which established the connection, to carry out the disconnection.

In case where it is judged that the request for update of the plug register includes change in the p2p counter 611 (YES in Step S131), on the other hand, it is then judged as whether the request for update was made by the controller 60 of the transmitting apparatus TR or by the other apparatus (Step S132).

When it is judged that the request for update was made by the controller 60 of the transmitting apparatus TR (YES in Step S132), it is then judged as whether or not the request for update includes increment in the p2p counter 611 (Step S133).

In case where it is judged that the request for update includes increment in the p2p counter 611, and namely that such a request is a request for establishment of the p2p connection (YES in Step S133), an increment (e.g. of "1") due to the establishment is added to the number of self-established connection (Step S134) and then the processing enters Step S13 as shown in FIG. 7.

In case where it is judged that the request for update includes no increment in the p2p counter 611, and namely that such a request is a request for disconnection of the p2p connection, made by the controller 60 (NO in Step S133), on the other hand, a decrement (e.g. of "1") due to the disconnection is subtracted from the number of self-established connection (Step S135) and then the processing enters Step S13 as shown in FIG. 7.

Turning to the judgment in Step S132, in case where the request for update is made by the other apparatus (NO in Step S132), it is then judged whether or not such a request for update includes increment in the p2p counter 611 (Step S136).

In case where it is judged that the request for update includes increment in the p2p counter 611, and namely that the request for update is a request for establishment of the p2p connection made by the apparatus, which sent the request for update (YES in Step S136), it is then judged that such the request for update is correct, and the processing enters Step S13 as shown in FIG. 7.

In case where it is judged that the request for update includes no increment in the p2p counter 611, and namely that such a request is a request for disconnection of the p2p connection, made by the other apparatus than that from which the request for update was sent (No in Step S136), it is then judged whether or not the value of the p2p counter 611 after the update is not less than the number of self-established connection (Step S137).

There are two cases, i.e., i.e., the one case where the establishment of the p2p connection is made by the transmitting apparatus TR itself, and the other case where that the other apparatus causes the transmitting apparatus to make establishment of the p2p connection, as described above. The p2p counter 611 indicates the total amount of the number of establishment. It is therefore reasonable to judge that the request for update in which the value of the p2p counter is less than the number of self-established connection, is an incorrect request for update made by any apparatus that does not satisfy the IEC-61883 Part 1 standard, because the value of the p2p counter 611 always become not less than the number of self-established connection.

In case where it is judged in Step S137 that the value of the p2p counter 611 after the update is not less than the number of self-established connection (YES in Step S137), the request for update is judged to be correct and then, the processing enters Step S13 as shown in FIG. 7.

In case where it is judged in Step S137 that the value of the p2p counter 611 after the update is less than the number of self-established connection (NO in Step S137), it is then judged that the request for update is not correct, and namely, that such a request is a request for update, which was made by the other apparatus that does not satisfy the IEC-61883 Part 1 standard, than the apparatus having establishment of the p2p connection, and then the processing enters Step S15 as shown in FIG. 7.

The protection processing after the judgment processing is executed in the same manner as the first embodiment of the present invention. With respect to the initialization of the judgment processing for correctness of the request for update as shown in FIG. 9, when the bus reset generates in the protection processing, a processing is executed to set the number of self-established connection as "null" in Step S21 upon generating the bus reset as shown in FIG. 12 (Step S221).

According to the embodiment described above of the present invention, it is judged whether or not the request for update of the p2p connection, which was made by the other apparatus connected to the serial bus 64, satisfies the predetermined standard, and when the above-mentioned standard is not satisfied, no response to the request for update is made. It is therefore possible to protect the p2p connection against the request for update made by any incorrect nonstandardized apparatus.

The judgment of the embodiment of the present invention maybe applicable to a case where, although the other apparatus connected to the serial bus 64 is based on the IEC-61883 Part 1 standard, a communication error may cause for some reasons.

More specifically, there is a possibility that the p2p connection as already established may be interrupted in accordance with an erroneous request for update due to transmission error in the similar manner to the first embodiment of the present invention. In such a case, even when the transmitting apparatus TR received the erroneous request for update due to the transmission error, the plug register managing unit 61 judges that the request for update in which the value of the p2p counter is less than the number of self-established connection, is to disconnect the connection by any apparatus in which the p2p connection has not actually been established at that time, with the result that no response to the request for update is made. It is therefore possible to avoid an erroneous update of the plug register due to the transmission error, thus protecting the p2p connection.

In the embodiment of the present invention, the number of the p2p connection, which was made by the own apparatus is counted, and the request for update in which the value of the p2p counter 611 is less than the above-mentioned number, is judged as a nonstandardized request, and the disconnection based on such a request is not executed. It is therefore possible to protect effectively the connection, which is established by the own apparatus, of the existing p2p connections as already established.

In addition, only the number of connection, which is established by the own apparatus, is counted. Management of a plurality of values is not required, and management of only the number of connection suffices, thus providing an effect of reduction in costs for design.

IV Third Embodiment

Now, description will be given below of the third embodiment of the present invention. The third embodiment is to protect the p2p connection, which was established in the transmitting apparatus TR by the other apparatus, against a request for disconnection of the p2p connection, which is to be transmitted.

Figure 13:
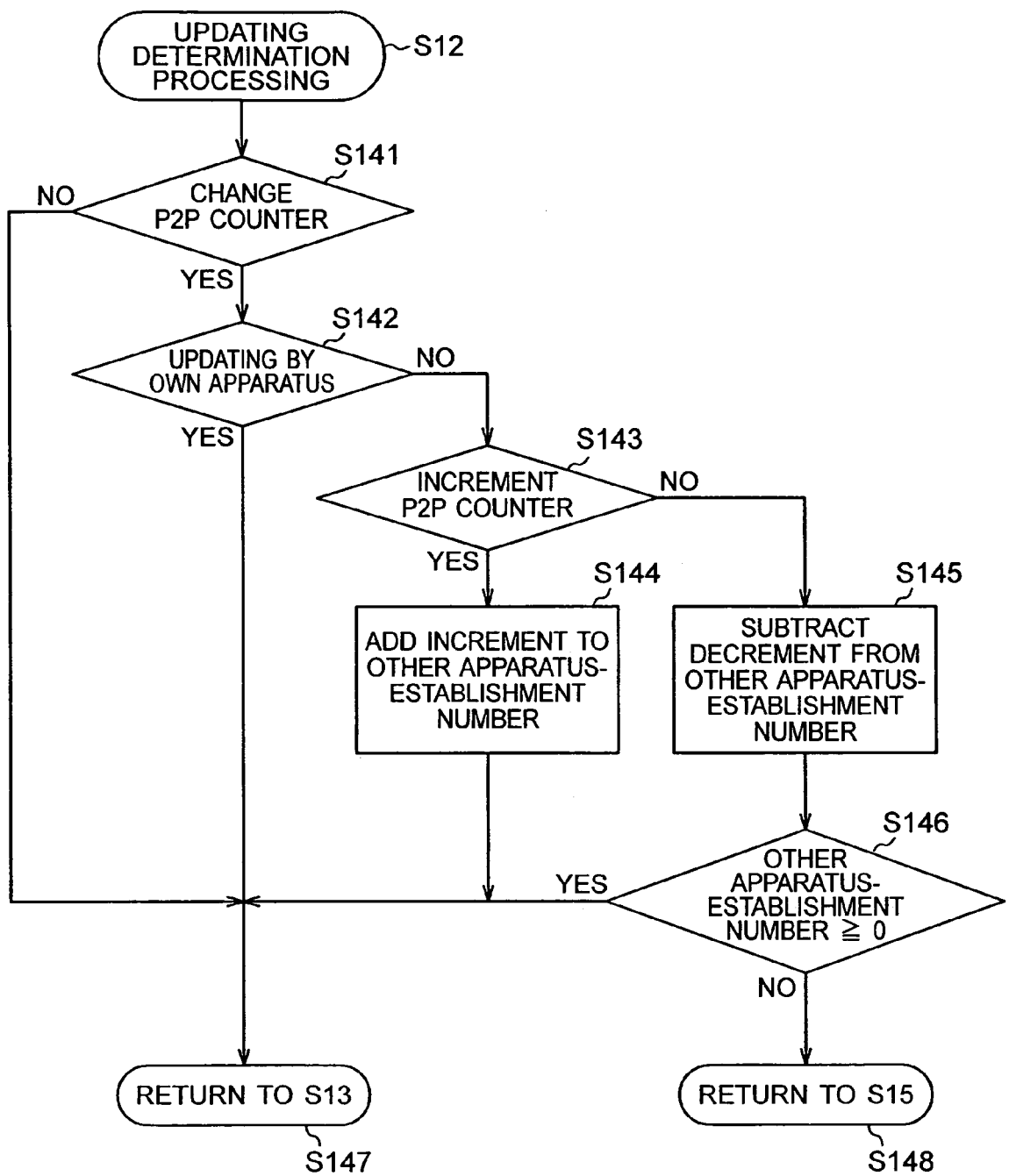
FIG. 13 is a flowchart showing a judgment processing, according to the third embodiment of the present invention, as whether or not the request for update is correct.
Figure 14:
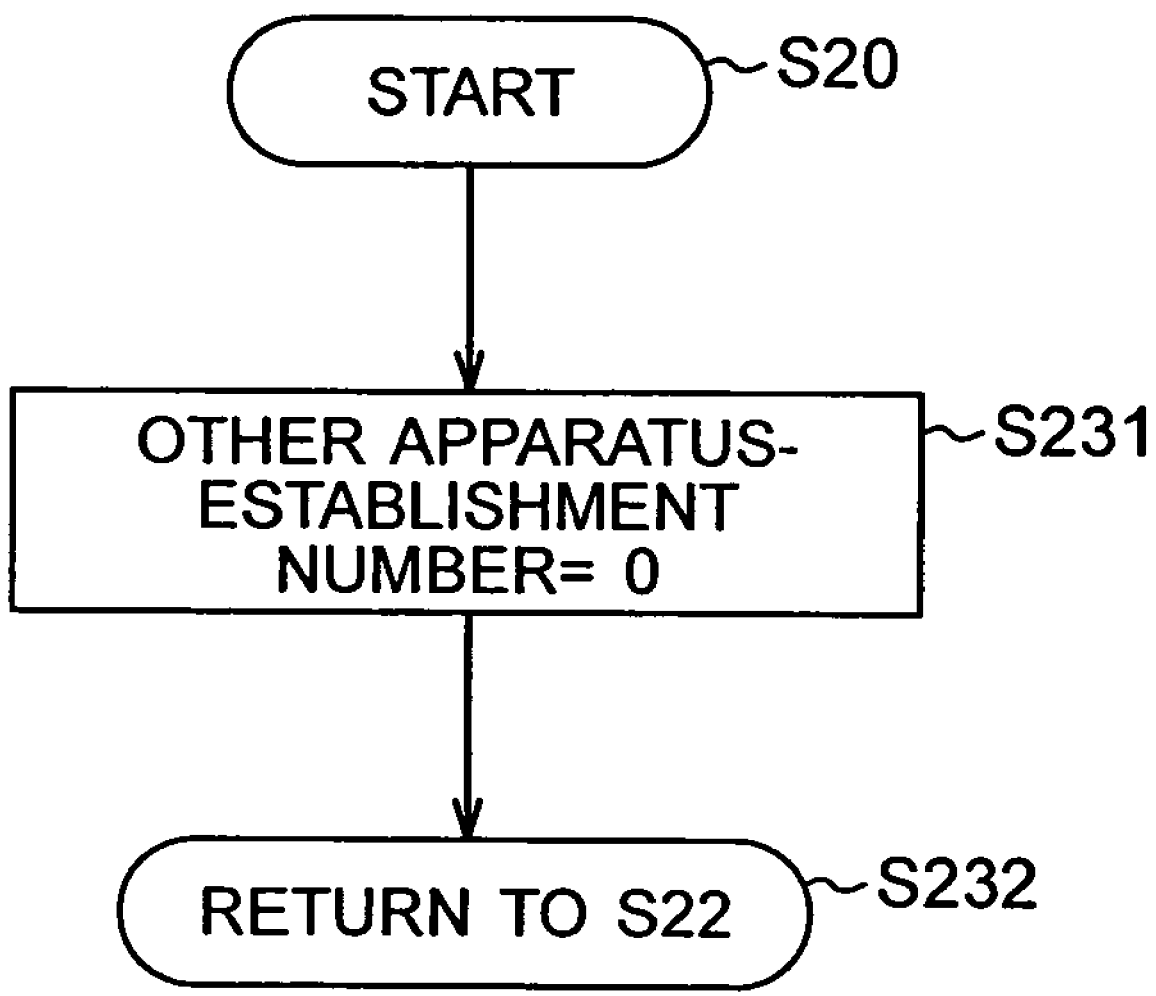
FIG. 14 is a view illustrating initialization of the judgment processing for correctness of the request for update, when the bus reset generates in the third embodiment of the present invention.
Figure 15:
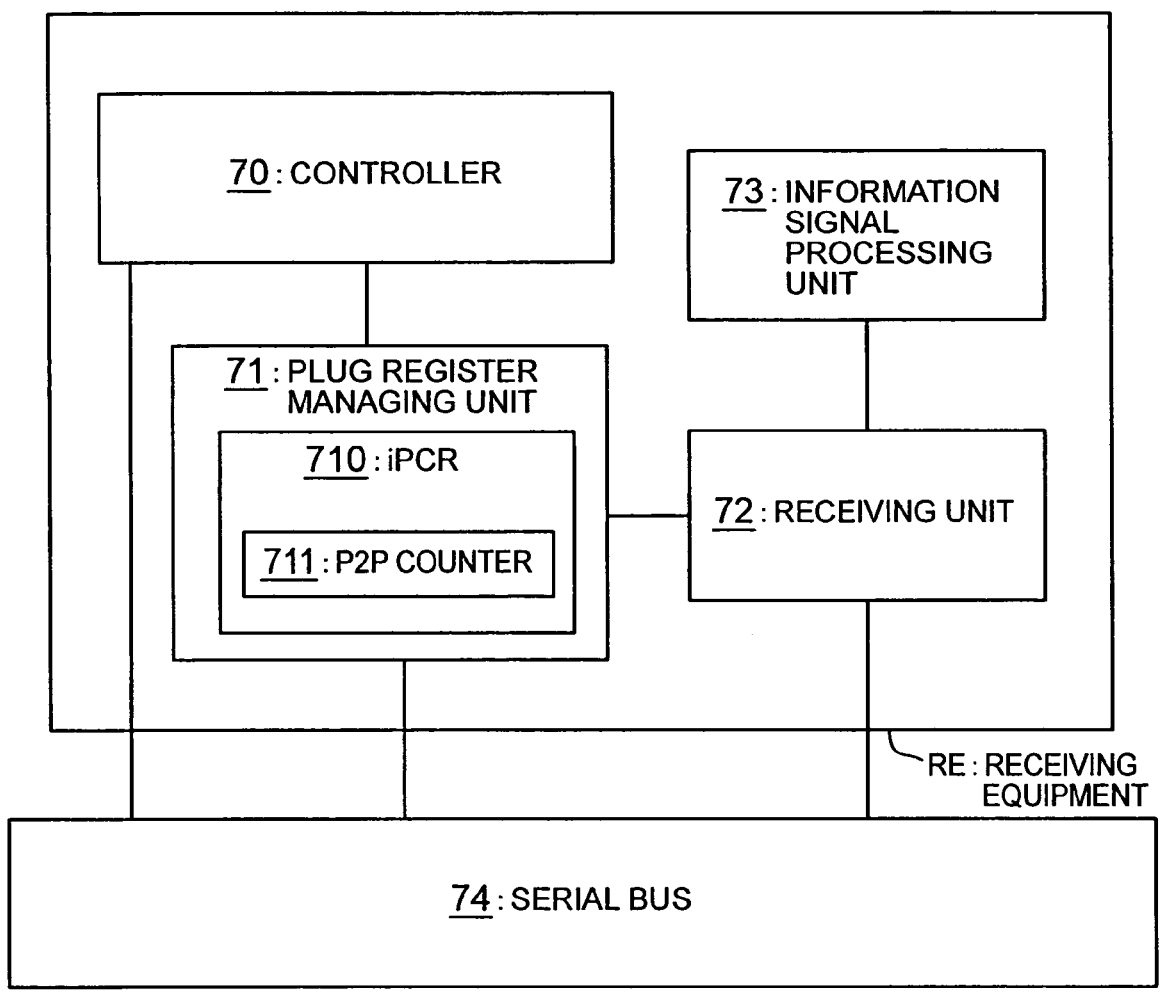
FIG. 15 is a block diagram illustrating a schematic configuration of a receiving apparatus according to the embodiment of the present invention.

The configuration of the transmitting apparatus according to the third embodiment of the present invention and the update processing of the plug register are the same as those in the first embodiment as described above of the present invention, and detailed description thereof is omitted. The judgment processing for correctness of the request for update, which is a characterized feature in the third embodiment of the present invention, will be described below with reference to FIGS. 13 and 14. FIG. 13 is a flowchart showing the judgment processing, according to the third embodiment of the present invention, as whether or not the request for update is correct, and FIG. 14 is a flowchart illustrating initialization of the judgment processing for correctness of the request for update, when the bus reset generates in the third embodiment of the present invention.

First, the judgment processing in Step S12 as shown in FIG. 7 will be described with reference to FIG. 13. In the third embodiment of the present invention, the plug register managing unit 61 serves as a reception device, a judgment device, a storage device, the number of externally established connection calculating device and a protection device.

In the judgment processing, the number of the p2p connection to the transmitting apparatus, which is established by he other apparatus, is counted, and a judgment is made on the basis of variation of the number. Accordingly, the judgment utilizes the concept of the number of the p2p connection established by the other apparatus, which is connected to the IEEE serial bus 64, i.e., the number of externally established connection.

First, in FIG. 13, it is judged as whether or not the request for update of the plug register includes change in the p2p counter 611 of the transmitting apparatus TR (Step S141).

In case where it is judged that the request for update includes no change in the p2p counter 611 (NO in Step S141), the request for update is judged to be correct, and the processing enters Step S13 as shown in FIG. 7. More specifically, no change in the p2p counter 611 means that the request for update does not relate to the p2p connection, but relates to the broadcast connection. It is reasonable to judge that such a request for update is standardized and correct, because the broadcast connection enables any other apparatus than the apparatus, which established the connection, to carry out the disconnection.

In case where it is judged that the request for update includes change in the p2p counter 611 (YES in Step S141), and namely that such a request for update is a request of the p2p connection, on the other hand, it is then judged as whether or not the request for update was made by the controller 60 of the transmitting apparatus TR (Step S142).

In case where it is judged that the request for update was made by the controller 60 of the transmitting apparatus TR (YES in Step S142), the request for update is judged to be correct, and the processing enters Step S13 as shown in FIG. 7.

In case where the request for update was made by the other apparatus (NO in Step S142), on the other hand, it is then judged as whether or not the request for update includes increment in the p2p counter 611 (Step S143).

In case where it is judged that the request for update includes increment in the p2p counter 611, and namely that such a request is a request for establishment of the p2p connection made by the other apparatus (YES in Step S143), an increment (e.g. of "1") due to the establishment is added to the number of externally established connection (Step S144) and then the processing enters Step S13 as shown in FIG. 7.

In case where it is judged in Step S143 that the request for update includes no increment in the p2p counter 611, and namely that such a request is a request for disconnection of the p2p connection, made by the other apparatus (NO in Step S143), on the other hand, a decrement (e.g. of "1") due to the disconnection is subtracted from the number of externally established connection (Step S145), and it is then judged as whether or not the number of externally established connection after subtraction is any one of "null" and a positive number (Step S146).

The number of externally established connection, which is the number of connection established by the other apparatus, of the p2p connections, may be assumes as "null". It is therefore judged that the request for update in which the number of externally established connection is a negative number is an incorrect request for update.

In case where the number of externally established connection is judged to be "null" or positive (YES in Step S146), the request for update is judged to be correct, and the processing enters Step S13 as shown in FIG. 7.

In case where the number of externally established connection is judged to be negative (NO in Step S146), it is judged that the request for update is incorrect, and namely that such a request for update is a request, which was made by the other apparatus than the apparatus having establishment of the p2p connection and does not satisfy the IEC-61883 Part 1 standard, and then the processing enters Step S15 as shown in FIG. 7.

The protection processing after the judgment processing is executed in the same manner as the first embodiment of the present invention. With respect to the initialization of the judgment processing for correctness of the request for update in Step S21 as shown in FIG. 9, when the bus reset generates in the protection processing, a processing is executed to set the other-apparatus-establishment number as "null" in Step S21 upon generating the bus reset as shown in FIG. 14 (Step S231).

According to the embodiment described above of the present invention, it is judged whether or not the request for update of the p2p connection, which was made by the other apparatus connected to the serial bus 64, satisfies the predetermined standard, and when the above-mentioned standard is not satisfied, no response to the request for update is made. It is therefore possible to protect the p2p connection against the request for update made by any incorrect nonstandardized apparatus.

The judgment of the embodiment of the present invention may be applicable to a case where, although the other apparatus connected to the serial bus 64 is based on the IEC-61883 Part 1 standard, a communication error may cause for some reasons.

More specifically, there is a possibility that the p2p connection as already established may be interrupted in accordance with an erroneous request for update due to transmission error in the similar manner to the first embodiment of the present invention. In such a case, even when the transmitting apparatus TR received the erroneous request for update due to the transmission error, the plug register managing unit 61 judges that the request for update in which the other-apparatus-establishment number is negative, is to disconnect the connection by any apparatus in which the p2p connection has not actually been established at that time, with the result that no response to the request for update is made. It is therefore possible to avoid an erroneous update of the plug register due to the transmission error, thus protecting the p2p connection.

In the embodiment of the present invention, the number of the p2p connection, which was made by the other apparatus is counted, and the request for update in which the value of the p2p counter 611 is negative, is judged as a nonstandardized request, and the disconnection of the p2p connection according to such a request is not executed. It is therefore possible to protect effectively the connection, which is established by the own apparatus, of the existing p2p connections as already established.

In addition, only the number of connection, which is established by the other apparatus, is counted. Management of a plurality of values is not required, and management of only the number of connection suffices, thus providing an effect of reduction in costs for design.

The controller 60 is not essential in the embodiment of the present invention. The present invention is therefore applicable to an apparatus provided with no controller 60 for the transmitting apparatus, i.e., an apparatus, which provides no establishment of the p2p connection for itself, and has only a function of enabling establishment of the p2p connection upon a request from the other apparatus.

In the above-described first to third embodiments of the present invention, the present invention is applied to the transmitting apparatus TR. It is needless to say that the present invention may be applicable to a receiving apparatus for receiving data in the similar manner.

In this case, the receiving apparatus RE to which the present invention is applied, includes a controller 70 and a plug register managing unit 71 in the same manner as the above-described transmitting apparatus TR.

In addition, the receiving apparatus RE also includes a reception unit 72 for receiving an isochronous packet through the serial bus 74, and an information signal processing unit 73 for processing the isochronous packet as received in the form of information signals including audio information or video information.

The plug register managing unit 71, which is logically provided with an iPCR 710, performs transfer and reception of control signals relative to the other apparatus through the controller 70 or the serial bus 74, and further updates the iPCR 710, and controls start and halt of reception by the reception unit 72.

In such a case, the receiving apparatus RE differs from the above-described transmitting apparatuses TR according to the first to third embodiments of the present invention only in that the p2p connection established by the oPCT 610 is protected in the transmitting apparatuses TR, while the p2p connection established by the iPCR 710 is protected in the receiving apparatus RE. Accordingly, the same judgment processing and the same protection of the p2p connection as those in the above-mentioned first to third embodiments of the present invention are applied in such a receiving apparatus RE.

In the above-described embodiments of the present invention, the present invention is applied to the transmitting apparatus, which is connected through the serial bus serving as an example of a network. The present invention may be applicable to a network to which the respective apparatuses are connected through a parallel bus or a radio communication.

A program corresponding to the flowcharts of the update processing of the plug register and the judgment processing for correctness of the request for update, which are described above with reference to FIGS. 7 to 14, may be stored in an information recording medium such as a flexible disc. Execution of such a program by reading it through a microcomputer makes it possible to cause the microcomputer to function as the controller 60 or 70, and the plug register managing unit 61 or 71.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-138915 filed on May 16, 2003 including the specification, claims, drawings and summary is incorporated herein by reference in its entirety.

What is claimed is:

1. A communication apparatus, which is to be connected to a network to establish, one or more connections with one or more processing apparatus connected to the network, to perform at least one of transmission and reception of data, said communication apparatus comprising:

a reception device for receiving a disconnection request for disconnection of said connection, from said processing apparatus;

a judgment device for judging whether the disconnection request as received is legal or not; and a protection device for causing, when there was made a judgment that the disconnection request as received is not legal, disablement of execution of a disconnection processing to protect said connection;

a storage device for storing the number of established connections for each connected processing apparatus, which is indicative of the number of connections established with the processing apparatus, for each processing apparatus through which a request for establishment of said connection was made; and the number of established connections for each connected processing apparatus calculating device for, when said connection with the processing apparatus is to be disconnected, subtracting the number of connections to be disconnected from said number of established connections for each connected processing apparatus corresponding to the connection prior to disconnection, wherein:

said judgment device judges, when the disconnection request is received from the processing apparatus in which the apparatus-establishment number has already become null, that the disconnection request is not legal.

2. A communication apparatus, which is to be connected to a network to establish, one or more connections with one or more processing apparatus connected to the network, to perform at least one of transmission and reception of data, said communication apparatus comprising:

a reception device for receiving a disconnection request for disconnection of said connection, from said processing apparatus;

a judgment device for judging whether the disconnection request as received is legal or not; and a protection device for causing, when there was made a judgment that the disconnection request as received is not legal, disablement of execution of a disconnection processing to protect said connection;

a storage device for storing (i) the number of self-established connection, which is indicative of the number of connections established due to a request for establishment, which is made to the processing apparatus by said communication apparatus, and (ii) a total number of connections, which is established between the communication apparatus and the processing apparatus; and the number of self-established connection calculating device not only for adding, when the request for establishment of the connection is made to said one of the processing apparatus by said communication apparatus to establish the connection, the number of connections to be established to said number of self-established connections, but also for subtracting, when any one of the connections currently established with said communication apparatus is to be disconnected by said communication apparatus, the number of the connections to be disconnected from said number of self-established connections, wherein:

said judgment device judges, when the total number of connections, which are made, in consequence of execution of said disconnection processing, to the processing apparatus by said communication apparatus becomes smaller than said number of self-established connections, that the disconnection request corresponding to said disconnection processing is not legal.

3. A communication apparatus, which is to be connected to a network to establish, one or more connections with one or more processing apparatus connected to the network, to perform at least one of transmission and reception of data, said communication apparatus comprising:

a reception device for receiving a disconnection request for disconnection of said connection, from said processing apparatus;

a judgment device for judging whether the disconnection request as received is legal or not; and a protection device for causing, when there was made a judgment that the disconnection request as received is not legal, disablement of execution of a disconnection processing to protect said connection;

a storage device for storing the number of externally established connections, which is indicative of the number of connections established due to a request for establishment, which is made to said communication apparatus by said processing apparatus; and the number of externally established connection calculating device not only for adding, when the request for establishment of the connection is made to said communication apparatus by said processing apparatus to establish the connection, the number of connections to be established to said number of externally established connections, but also for subtracting, when any one of the connections currently established with said communication apparatus is to be disconnected by said processing apparatus, the number of the connections to be disconnected from said number of externally established connections, wherein:

said judgment device judges, when said number of externally established connection stored in said storage device in consequence of execution of said disconnection processing becomes negative, that the disconnection request corresponding to subtraction is not legal.

4. The communication apparatus as claimed in claim 1, wherein:

said communication apparatus is based on a predetermined standard in correspondence with the network; and said judgment device judges, when the request as received is based on said predetermined standard, said disconnection request is legal, and when the request as received is not based on said predetermined standard, said disconnection request is not legal.

5. The communication apparatus as claimed in claim 4, wherein:

said predetermined standard is an IEEE (Institute of Electrical and Electronic Engineers) standard 1394; and said protection device causes said disablement of the execution of the disconnection processing, and generates a bus reset according to the IEEE standard 1394, to protect said connection.

6. The communication apparatus as claimed in claim 1, wherein:

said protection device causes said disablement of the execution of the disconnection processing, and sends a response that the disconnection processing in response to said disconnection request has not been executed, to the processing apparatus from which said disconnection request was sent.

7. The communication apparatus as claimed in claim 1, wherein:

said protection device causes said disablement of the execution of the disconnection processing, and said communication apparatus further comprises a disablement device for disabling a response to said disconnection request from being sent to said processing apparatus from which said disconnection request was sent.

8. The communication apparatus as claimed in claim 1, wherein:

said protection device causes said disablement of the execution of the disconnection processing, and sends a response that the disconnection processing in response to said disconnection request has been executed, to the processing apparatus from which said disconnection request was sent.

9. The communication apparatus as claimed in claim 1, wherein:

said connection is a p2p (Point-to Point) connection based on an IEEE (Institute of Electrical and Electronic Engineers) standard 1394 and said communication apparatus is based on both of said IEEE standard 1394 and an IEC (International Electrotechnical Commision)-61883, Part 1 standard.

10. A communication method, which is to be carried out by a communication apparatus connected to a network to establish, one or more connections with one or more processing apparatus connected to the network, to perform at least one of transmission and reception of data, said communication method comprising:

a reception step for receiving a disconnection request for disconnection of said connection, from said processing apparatus;

a judgment step for judging whether the disconnection request as received is legal or not;

a protection step for causing, when there was made a judgment that the disconnection request as received is not legal, disablement of execution of a disconnection processing to protect said connection;

a storage step for storing the number of established connections for each connected processing apparatus, which is indicative of the number of connections established with the processing apparatus, for each processing apparatus through which a request for establishment of said connection was made; and the number of established connections for each connected processing apparatus calculating step for, when said connection with the processing apparatus is to be disconnected, subtracting the number of connections to be disconnected from said number of established connections for each connected processing apparatus corresponding to the connection prior to disconnection, wherein:

said judgment step judges, when the disconnection request is received from the processing apparatus in which the apparatus-establishment number has already become null, that the disconnection request is not legal.

11. A communication program stored on a computer readable media, which is to be executed by a computer that is included in a communication apparatus connected to a network to establish, one or more connections with one or more processing apparatus connected to the network, to perform at least one of transmission and reception of data, to cause the computer to function as:

a reception device for receiving a disconnection request for disconnection of said connection, from said processing apparatus;

a judgment device for judging whether the disconnection request as received is legal or not;

a protection device for causing, when there was made a judgment that the disconnection request as received is not legal, disablement of execution of a disconnection processing to protect said connection;

a storage device for storing the number of established connections for each connected processing apparatus, which is indicative of the number of connections established with the processing apparatus, for each processing apparatus through which a request for establishment of said connection was made; and the number of established connections for each connected processing apparatus calculating device for, when said connection with the processing apparatus is to be disconnected, subtracting the number of connections to be disconnected from said number of established connections for each connected processing apparatus corresponding to the connection prior to disconnection, wherein:

said judgment device judges, when the disconnection request is received from the processing apparatus in which the apparatus-establishment number has already become null, that the disconnection request is not legal.

* * * * *